(12) United States Patent
Sakai

(10) Patent No.: US 9,891,432 B2
(45) Date of Patent: Feb. 13, 2018

(54) OBJECT DETECTION DEVICE AND SENSING APPARATUS

(71) Applicant: Kohji Sakai, Tokyo (JP)

(72) Inventor: Kohji Sakai, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 450 days.

(21) Appl. No.: 14/600,483

(22) Filed: Jan. 20, 2015

(65) Prior Publication Data

US 2015/0204977 A1 Jul. 23, 2015

(30) Foreign Application Priority Data

Jan. 23, 2014 (JP) ................................ 2014-009994

(51) Int. Cl.
| | |
|---|---|
| *G01C 3/08* | (2006.01) |
| *G02B 26/12* | (2006.01) |
| *G01S 17/93* | (2006.01) |
| *G01S 17/42* | (2006.01) |
| *G01S 7/481* | (2006.01) |

(52) U.S. Cl.
CPC .......... *G02B 26/123* (2013.01); *G01S 7/4815* (2013.01); *G01S 7/4817* (2013.01); *G01S 17/42* (2013.01); *G01S 17/936* (2013.01)

(58) Field of Classification Search
CPC .... G01S 17/026; G01S 17/936; G02B 26/123
USPC ....................................................... 356/4.01
See application file for complete search history.

(56) References Cited

U.S. PATENT DOCUMENTS

| | | | | |
|---|---|---|---|---|
| 3,781,111 | A * | 12/1973 | Fletcher | G01S 17/10 250/553 |
| 5,504,569 | A * | 4/1996 | Kato | B60T 7/22 180/169 |
| 5,552,893 | A * | 9/1996 | Akasu | G01C 3/00 356/4.01 |
| 5,864,391 | A | 1/1999 | Hosokawa et al. | |
| 5,898,483 | A * | 4/1999 | Flowers | G01S 17/42 356/4.01 |
| 6,301,003 | B1 * | 10/2001 | Shirai | G01S 7/4816 180/169 |

(Continued)

FOREIGN PATENT DOCUMENTS

| | | |
|---|---|---|
| JP | 2894055 | 3/1999 |
| JP | 3446466 | 7/2003 |

(Continued)

OTHER PUBLICATIONS

U.S. Appl. No. 14/554,498, filed Nov. 26, 2014, Akatsu, et al.

(Continued)

*Primary Examiner* — Mark Hellner
(74) *Attorney, Agent, or Firm* — Oblon, McClelland, Maier & Neustadt, L.L.P.

(57) ABSTRACT

An object detection device includes: a light projection unit that includes a light source having a plurality of light emitting units that are arranged along at least one direction; a light scanning unit that scans light emitted from the light projection unit along the one direction; a light receiving unit that receives light emitted from the light scanning unit and reflected on an object; and a control unit that determines a light emitting unit to be turned on among the light emitting units, according to a direction of travel of light scanned by the light scanning unit.

20 Claims, 34 Drawing Sheets

(56) References Cited

U.S. PATENT DOCUMENTS

| | | | | |
|---|---|---|---|---|
| 6,671,037 B2* | 12/2003 | Isogai | ................... | G01C 3/22 |
| | | | | 180/169 |
| 7,544,945 B2* | 6/2009 | Tan | ................... | G01S 7/4811 |
| | | | | 180/169 |
| 9,568,605 B2 | 2/2017 | Akatsu et al. | | |
| 2012/0038903 A1* | 2/2012 | Weimer | ................ | G01C 3/08 |
| | | | | 356/4.07 |
| 2015/0124238 A1 | 5/2015 | Sakai et al. | | |
| 2015/0204977 A1 | 7/2015 | Sakai | | |
| 2015/0260830 A1* | 9/2015 | Ghosh | ................. | G01S 7/484 |
| | | | | 250/208.1 |
| 2015/0268343 A1 | 9/2015 | Uehira et al. | | |
| 2017/0082747 A1 | 3/2017 | Akatsu et al. | | |

FOREIGN PATENT DOCUMENTS

| | | |
|---|---|---|
| JP | 2007-214564 | 8/2007 |
| JP | 2009-037283 | 2/2009 |
| JP | 2010-096574 | 4/2010 |
| JP | 2015-111090 A | 6/2015 |
| JP | 2015-129734 A | 7/2015 |
| JP | 2015-137951 A | 7/2015 |
| JP | 2015-178976 A | 10/2015 |
| JP | 2016-14577 A | 1/2016 |

OTHER PUBLICATIONS

U.S. Appl. No. 14/554,498, filed Nov. 26, 2014.
Japanese Office Action dated Nov. 15, 2017 in Japanese Application No. 2014-009994 (2 pages).

* cited by examiner

DETECTION DISTANCE   Px

OBJECT DETECTION DEVICE AND SENSING APPARATUS

CROSS-REFERENCE TO RELATED APPLICATIONS

The present application claims priority to and incorporates by reference the entire contents of Japanese Patent Application No. 2014-009994 filed in Japan on Jan. 23, 2014.

BACKGROUND OF THE INVENTION

1. Field of the Invention

The present invention relates to an object detection device and a sensing apparatus, and more specifically to an object detection device a detection target of which is an object, and a sensing apparatus that includes the object detection device.

2. Description of the Related Art

In recent years, an object detection device to detect presence or absence of an object or distance to the object has been developed actively.

For example, in Japanese Laid-open Patent Publication No. 2010-096574, a laser radar is disclosed that includes a light projection unit that emits laser beams, a scanning unit that two-dimensionally scans laser beams emitted from this light projection unit, a control unit that issues a projection instruction of laser beams to the light projection unit and that controls scanning by the scanning unit, a selecting unit that selects only a reflection laser beam that reflects on and returns from a measurement target by laser beam scanning by the scanning unit, based on an instruction from the control unit, a light receiving unit that receives the reflection laser beam selected by this selecting unit, and a distance calculating unit that acquires distance information of the measurement target based on light emission timing of a laser beam given by the control unit and on light reception timing of the reflection laser beam given by the light receiving unit.

Moreover, in Japanese Patent No. 2894055, a laser radar device that is mounted on a vehicle and that determines whether an obstacle is present based on reflection light from an object of laser beams that are sent to space forward in a direction of travel is disclosed that includes a light sending unit that sends laser beams to a visual field forward in the direction of travel of the vehicle, a light receiving unit that has a reception optical system receiving reflection laser beams from the visual field, that divides the visual field into three or more in a horizontal direction as light-receiving visual fields, and that performs processing such as electric conversion, amplification, and digitalization of reflection laser beams collected by the reception optical system independently for each of the divided visual fields, and a signal processing unit that chronologically processes each output of the light receiving unit in predetermined sequence, and that performs determination of presence or absence of an obstacle in each of the visual fields, measurement of distance to an obstacle, and chronological monitoring of movement of an obstacle in each of the divided visual fields.

Furthermore, in Japanese Patent No. 3446466, a reflection measuring device is disclosed that includes a rotation polygon mirror having multiple reflection surfaces with various inclination angles relative to a rotation axis, a light source that generates pulsed light, a pulsed-light entering unit that cause the pulsed light to enter the rotation polygon mirror from a predetermined direction, and a light receiving unit that receives pulsed light emitted from a reflection surface of the rotation polygon mirror to a forward measuring area and returned from an object in the measuring area.

However, in conventional devices, it has been difficult to achieve both improvement of detection resolution and increase of life of a light source.

SUMMARY OF THE INVENTION

It is an object of the present invention to at least partially solve the problems in the conventional technology.

An object detection device includes: a light projection unit that includes a light source having a plurality of light emitting units that are arranged along at least one direction; a light scanning unit that scans light emitted from the light projection unit along the one direction; a light receiving unit that receives light emitted from the light scanning unit and reflected on an object; and a control unit that determines a light emitting unit to be turned on among the light emitting units, according to a direction of travel of light scanned by the light scanning unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
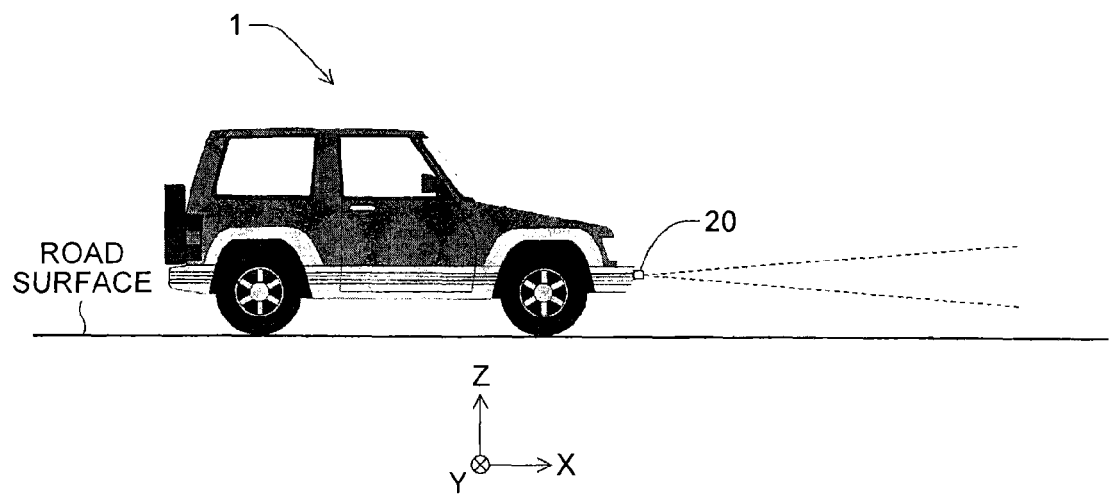
FIG. 1 is an external view of a vehicle on which a laser radar 20 according to an embodiment of the present invention is mounted.

Embodiments of the present invention are explained below based on FIG. 1 to FIG. 46. FIG. 1 indicates an external view of a vehicle 1 on which the laser radar 20 as an object detection device according to an embodiment is mounted.

The laser radar 20 is, for example, installed near a license plate on a front side of the vehicle 1. In the present specification, a direction perpendicular to a road surface is referred to as a Z axis direction, and a direction of travel of the vehicle 1 is referred to as a +X direction in XYZ three-dimensional rectangular coordinates.

Figure 2:
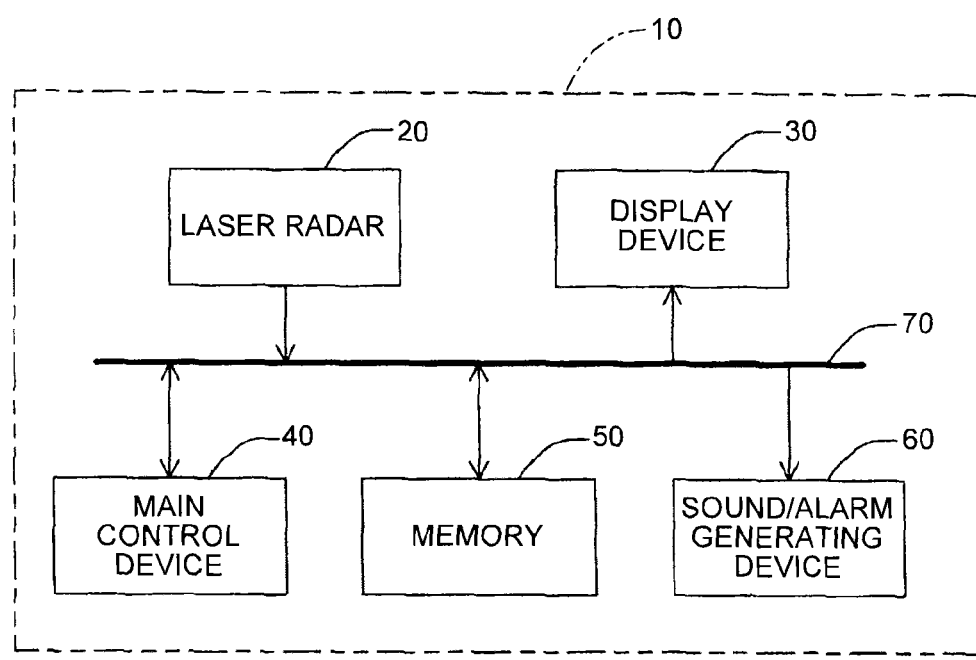
FIG. 2 is a block diagram for explaining a configuration of a monitoring device 10 according to an embodiment of the present invention.

Inside the vehicle 1, for example, a display device 30, a main control device 40, a memory 50, a sound/alarm generating device 60, and the like are equipped as indicated in FIG. 2. These are electrically connected through a bus 70 that enables data transmission.

In this example, a monitoring device 10 as a sensing device is configured with the laser radar 20, the display device 30, the main control device 40, the memory 50, and the sound/alarm generating device 60. That is, the monitoring device 10 is mounted on the vehicle 1.

Figure 3:
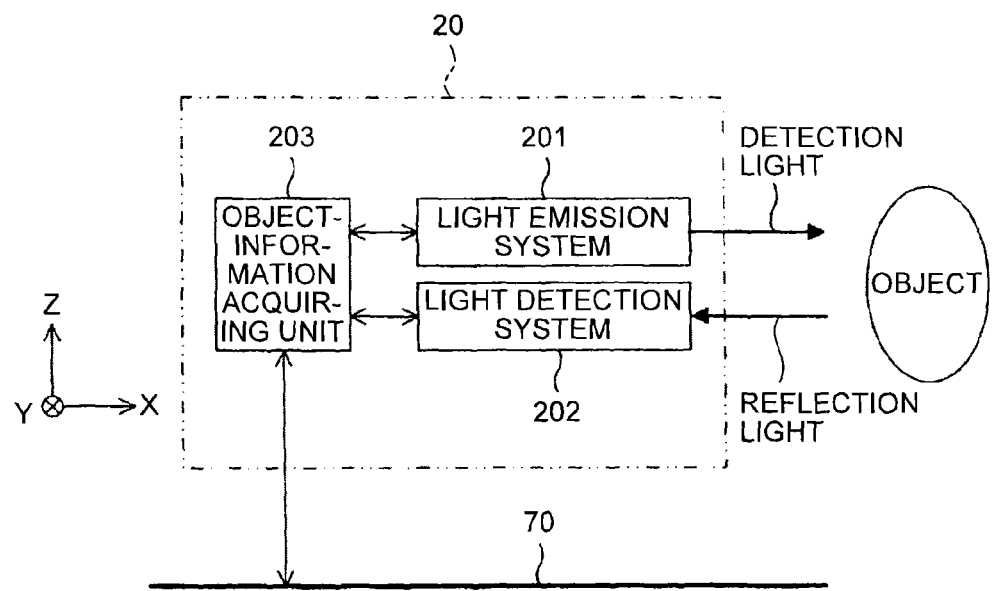
FIG. 3 is a configuration diagram of the laser radar 20.

The laser radar 20 includes a light emission system 201 that emits detection light in the +X direction, a light detection system 202 that detects light reflected from an object, and an object-information acquiring unit 203 that controls the light emission system and that acquires object information such as presence of an object, distance to an object, a size of an object, a shape of an object, and a position of an object based on a detection result by the light detection system 202 as indicated in FIG. 3. In this example, the light emission system 201 is located in a +Z direction from the light detection system 202. The light emission system 201, the light detection system 202, and the object-information acquiring unit 203 are housed in a not illustrated casing.

Figure 4:
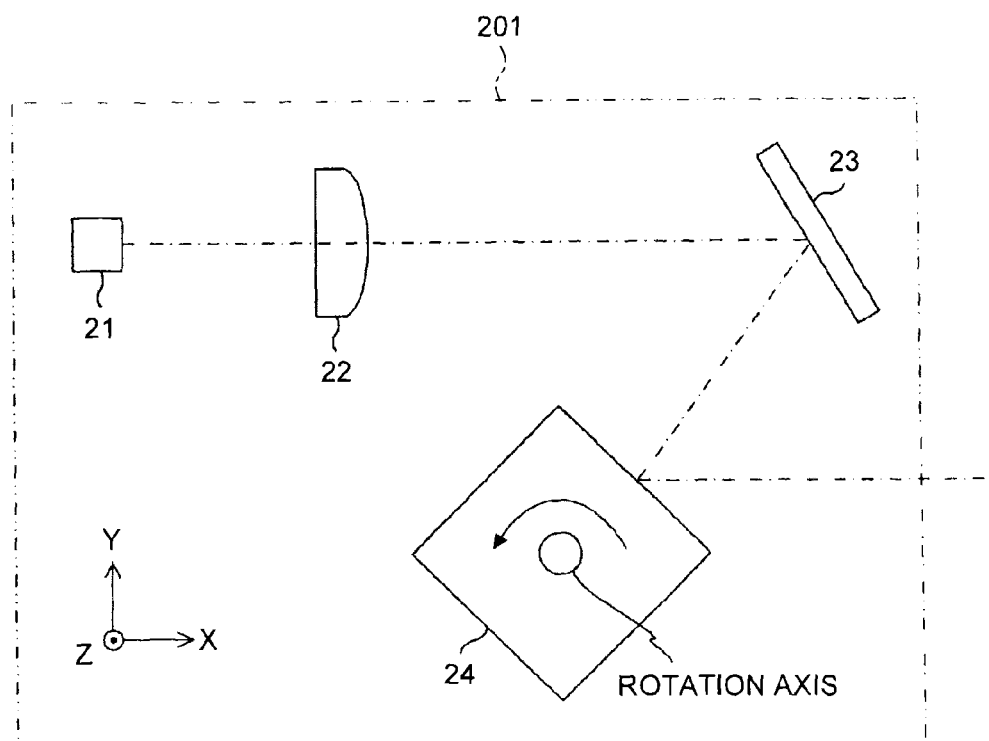
FIG. 4 is a diagram (Part 1) for explaining a light emission system.
Figure 5:
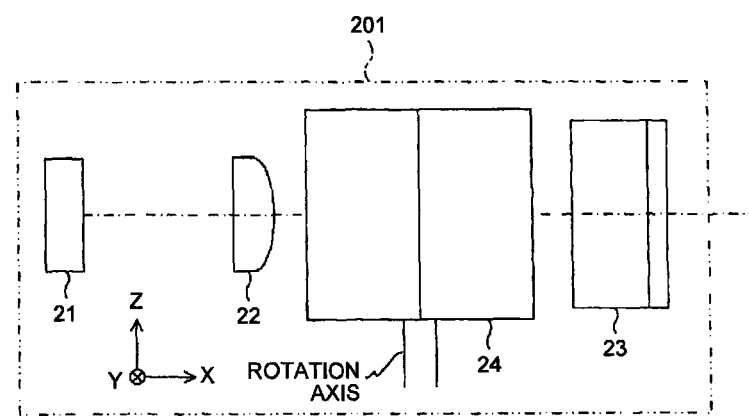
FIG. 5 is a diagram (Part 2) for explaining the light emission system.

The light emission system 201 includes the light source 21, the coupling lens 22, a first reflection mirror 23, and a first rotation mirror 24 as indicated in FIG. 4 and FIG. 5 as an example.

Figure 6:
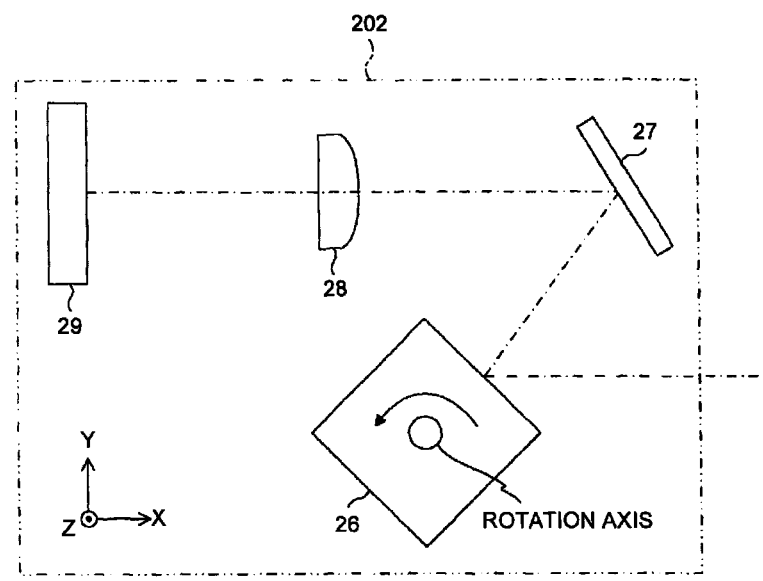
FIG. 6 is diagram (Part 1) for explaining a light detection system.
Figure 7:
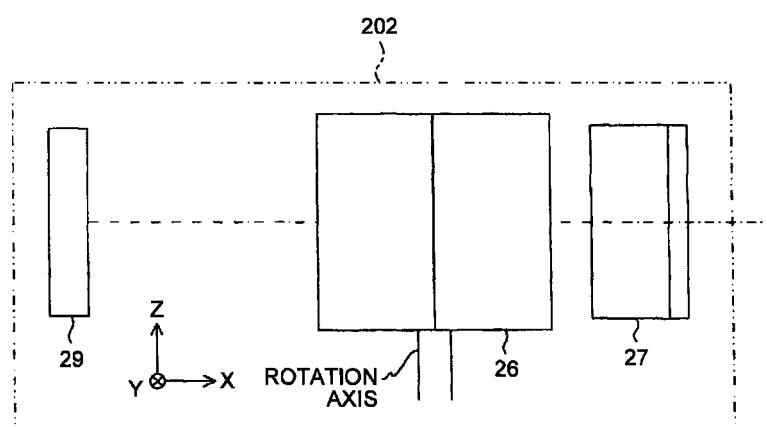
FIG. 7 is diagram (Part 2) for explaining a light detection system.

The light detection system 202 includes a second rotation mirror 26, a second reflection mirror 27, the image forming lens 28, and the photo detector 29 as indicated in FIG. 6 and FIG. 7 as an example.

Figure 8:
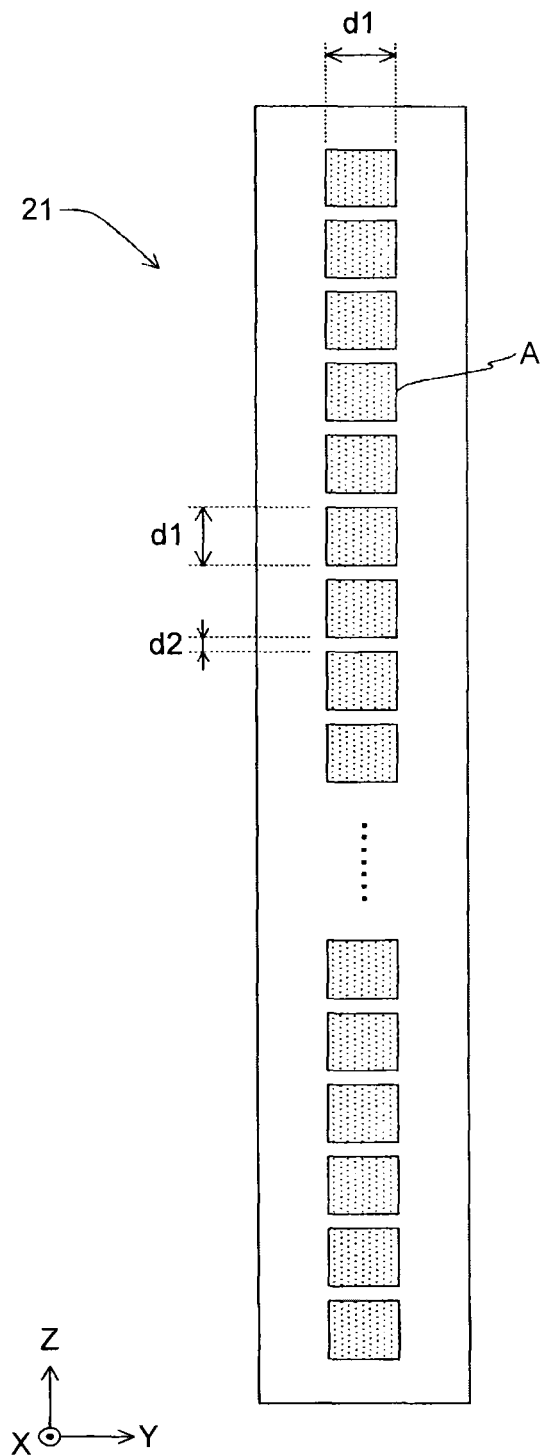
FIG. 8 is a diagram for explaining multiple light emitting unit groups.

In the light source 21, the light emitting unit groups A are arranged along the Z axis direction at regular intervals as indicated in FIG. 8 as an example. In this example, a shape of each of the light emitting unit groups is a square shape, and the length of a side thereof is d1. Moreover, a gap between adjacent two light emitting unit groups is d2.

Figure 9:
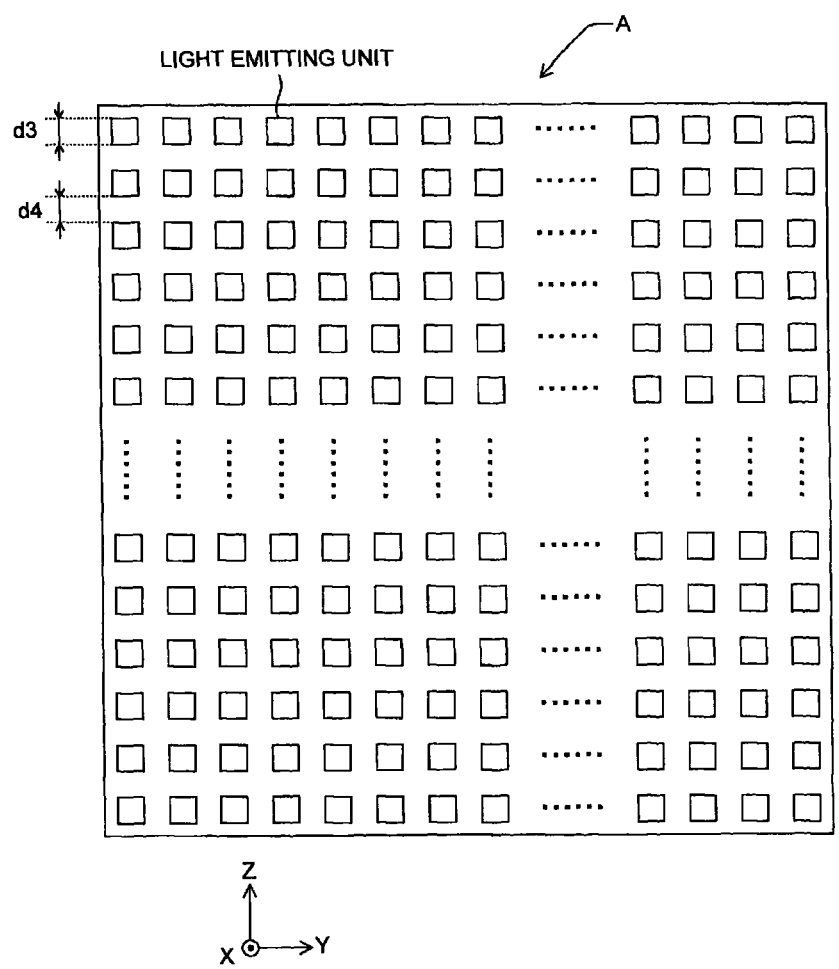
FIG. 9 is a diagram for explaining light emitting units that are included in each of the light emitting unit groups.

In each of the light emitting unit groups A, multiple light emitting units are arranged two-dimensionally as indicated in FIG. 9 as an example. The shape of each light emitting unit is a square shape, and length of a side thereof is d3. Moreover, a gap between adjacent two light emitting units is d4. The side of d1 is determined based on the number of light emitting units included in a light emitting unit group.

Each light emitting unit constitutes a vertical cavity surface emitting laser (VCSEL). That is, the light source 21 is a so-called surface emitting laser array.

Each light emitting unit is turned on and turned off by the object-information acquiring unit 203. From a turned on light emitting unit, light is emitted in the +X direction.

The coupling lens 22 is located in the +X direction from the light source 21. Note that in place of the coupling lens 22, a coupling optical system that has equivalent functions and includes multiple optical devices may be used.

The first reflection mirror 23 reflects light having passed through the coupling lens 22 toward the first rotation mirror 24.

The first rotation mirror 24 has multiple mirror surfaces (reflection surfaces) that rotate about a rotation axis parallel to the Z axis, and scans light from the first reflection mirror 23 along a Y axis direction. Each mirror surface of the first rotation mirror 24 is parallel to the rotation axis. In this example, the first rotation mirror 24 has four mirror surfaces. Rotation of the first rotation mirror 24 is controlled by the object-information acquiring unit 203. Light reflected on the mirror surface of the first rotation mirror 24 is detection light to be emitted from the laser radar 20.

Figure 10:
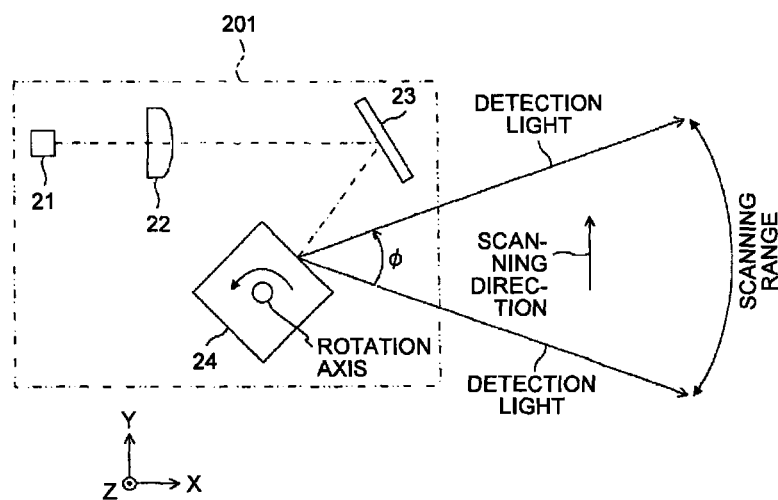
FIG. 10 is a diagram for explaining a scanning range of a first rotation mirror.

When the first rotation mirror 24 is rotated, the direction of travel of detection light changes in a plane perpendicular to the Z axis direction as indicated in FIG. 10 as an example. That is, the detection light is scanned along the Y axis direction with rotation of the first rotation mirror 24. In this example, the detection light is scanned in the +Y direction. In the following, an angle φ (refer to FIG. 10) formed between a direction of travel of light toward a −Y-side end of a scanning area and a direction of travel of light toward a +Y-side end of the scanning area in the plane perpendicular to the Z axis is also referred to as a scanning angle.

When an object is present in a detection rage, a part of light emitted from the laser radar 20 and reflected on the object returns to the laser radar 20. In the following, for convenience, light reflected on an object to be returned to the laser radar 20 is also referred to as "reflection light from an object".

The second rotation mirror 26 has multiple mirror surfaces that rotate about a rotation axis parallel to the Z axis, and reflects reflection light from an object traveling toward a mirror surface of the second reflection mirror 27. Each mirror surface of the second rotation mirror 26 is parallel to the rotation axis. In this example, the second rotation mirror 26 has four mirror surfaces. Rotation of the second rotation mirror 26 is controlled by the object-information acquiring unit 203.

The object-information acquiring unit 203 synchronizes the first rotation mirror 24 and the second rotation mirror 26, and controls the rotation angles thereof to be equal to each other. To the first rotation mirror 24 and the second rotation mirror 26, respective sensors (for example, Hall devices) to detect the rotation angle are arranged, and an output signal of each of the sensors is transmitted to the object-information acquiring unit 203. That is, the object-information acquiring unit 203 is possible to acquire the rotation angles of the first rotation mirror 24 and the second rotation mirror 26, based on the output signals of the respective sensors.

The second reflection mirror 27 reflects light from the second rotation mirror 26 in a −X direction.

The image forming lens 28 is located in the −X direction from the second reflection mirror 27, and collects light reflected by the second reflection mirror 27.

The photo detector 29 receives light through the image forming lens 28, and outputs a signal corresponding to the amount of reception light to the object-information acquiring unit 203. The object-information acquiring unit 203 determines that reflection light from an object is received when an output level of the photo detector 29 is equal to or higher than a predetermined threshold. As a photo detection device of the photo detector 29, an avalanche photo diode (APD) and an ordinary PIN photo diode (PD) can be used.

The object-information acquiring unit 203 turns the light source 21 on and off, and controls driving of the first rotation mirror 24 and the second rotation mirror 26. Moreover, the object-information acquiring unit 203 acquires information on presence or absence of an object based on an output signal of the photo detector 29. When an object is present, the object-information acquiring unit 203 acquires distance to the object and/or the like based on turning on timing of the light source 21 and light reception timing of the photo detector 29.

Figure 11:
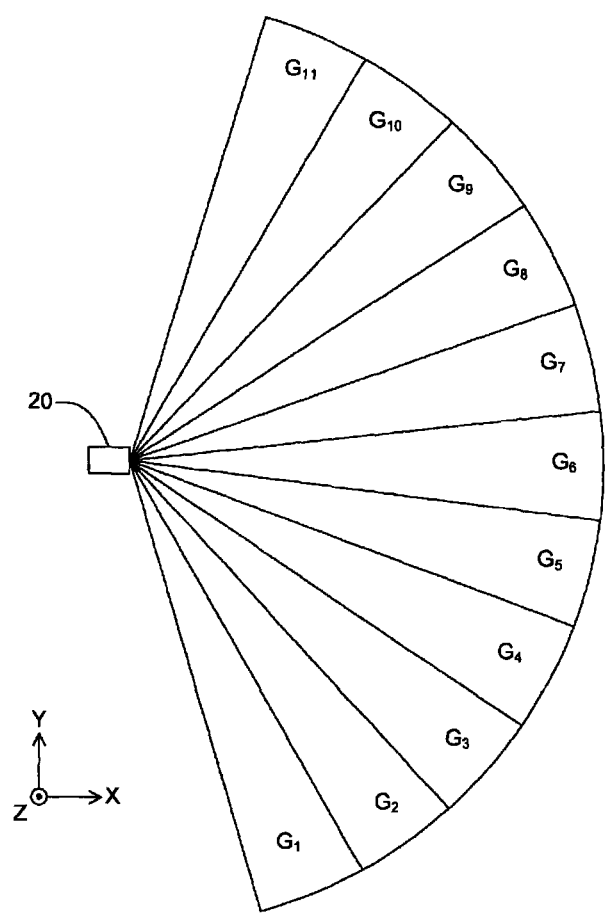
FIG. 11 is a diagram for explaining division of a scanning range.

Next, a scanning range is explained. As an example, a scanning range is divided into 11 partial regions ($G_1$ to $G_{11}$) as indicated in FIG. 11.

Figure 12:
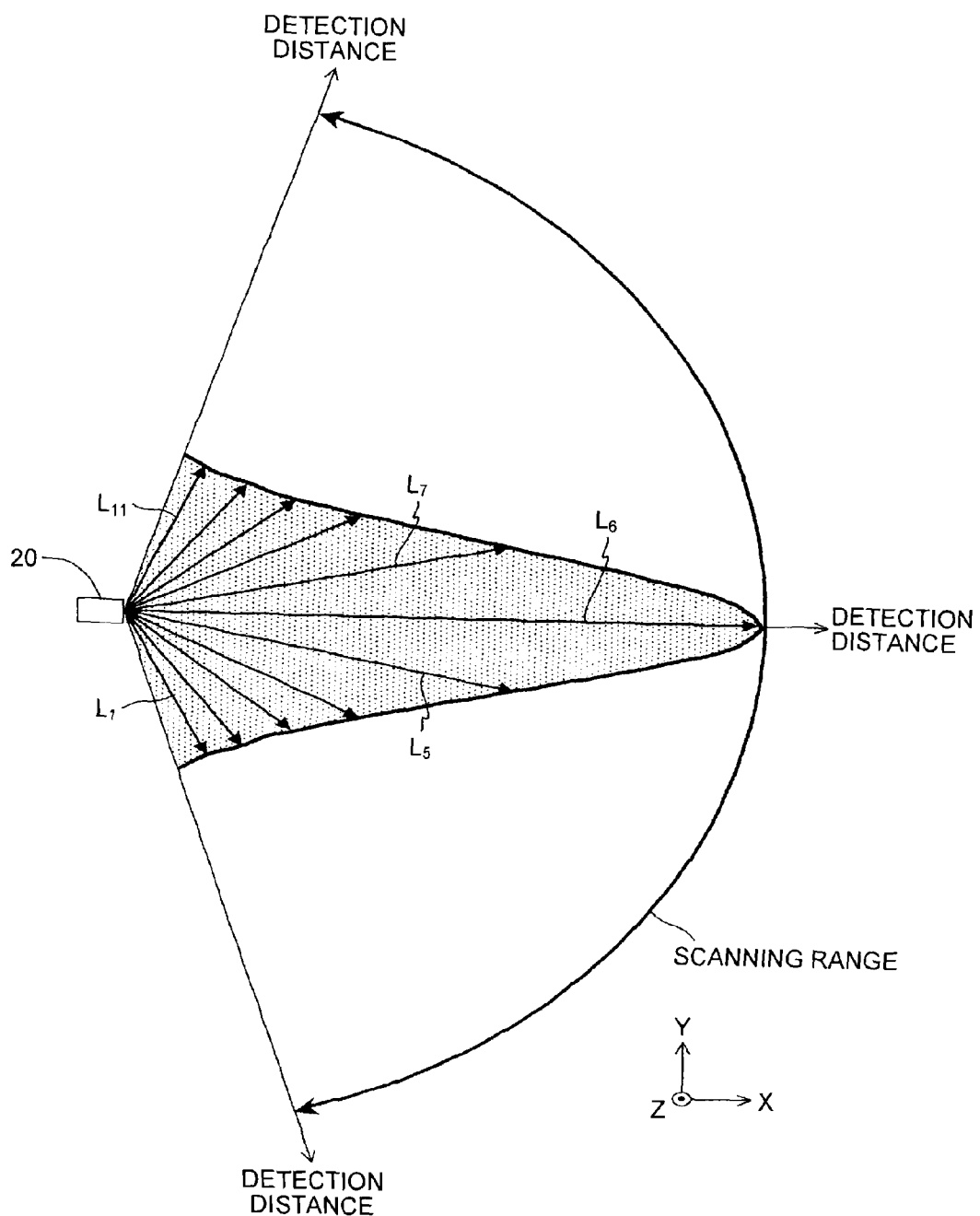
FIG. 12 is a diagram for explaining a detection distance $L_m$.

In the partial regions $G_1$ and $G_{11}$, for example, a bicycle or a motorcycle passing by the vehicle 1, a person or an animal running out from a blind spot, or the like is detected. Meanwhile, in the partial region $G_6$, another vehicle traveling in front is detected. At this time, as indicated in FIG. 12 as an example, detection distances $L_1$ and $L_{11}$ in the partial regions $G_1$ and $G_{11}$ may be shorter than a detection distance $L_6$ in the partial region $G_6$. In this example, a distance between the laser radar 20 and an object in a plane perpendicular to the Z axis is referred to as a detection distance.

This is because in a case in which detection is necessary in the partial regions $G_1$ and $G_{11}$, the speed of the vehicle 1 is slow, and considering the role to avoid contact with a bicycle, motorcycle, a person, and an animal, it is adequate if a region close to the vehicle 1 is considered. On the other hand, in a case in which detection is necessary in the partial region $G_6$, the speed of the vehicle 1 is fast, and when an automatic cruising function and the like are considered, it is necessary to cover a region far from the vehicle 1 to ensure tracking of a vehicle ahead certainly.

That is, according to a partial region $G_m$ ($1 \le m \le 11$), the detection distance $L_m$ ($1 \le m \le 11$) varies. This means that the light emission amount of the light source 21 may be changed to reduce the emission light amount in the partial regions $G_1$ and $G_{11}$ in which the detection distances are short, and to increase the emission light amount in the partial region $G_6$ in which the detection distance is long.

Thus, the amount of power consumption is reduced from that when the entire scanning range is irradiated with the light emission amount with which the partial region $G_6$ is irradiated, and deterioration of the light source 21 can be suppressed.

<<Arrangement Example 1 of Coupling Lens 22 and Image Forming Lens 28>>

Figure 13:
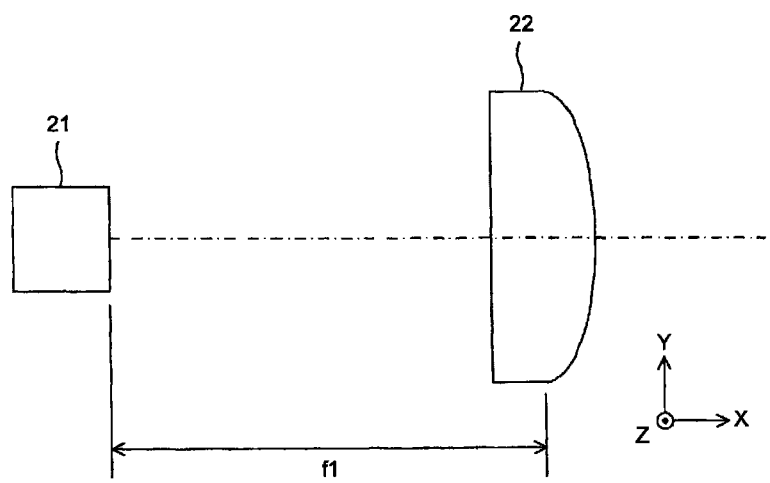
FIG. 13 is a diagram for explaining a position of a coupling lens 22 in an arrangement example 1.
Figure 14:
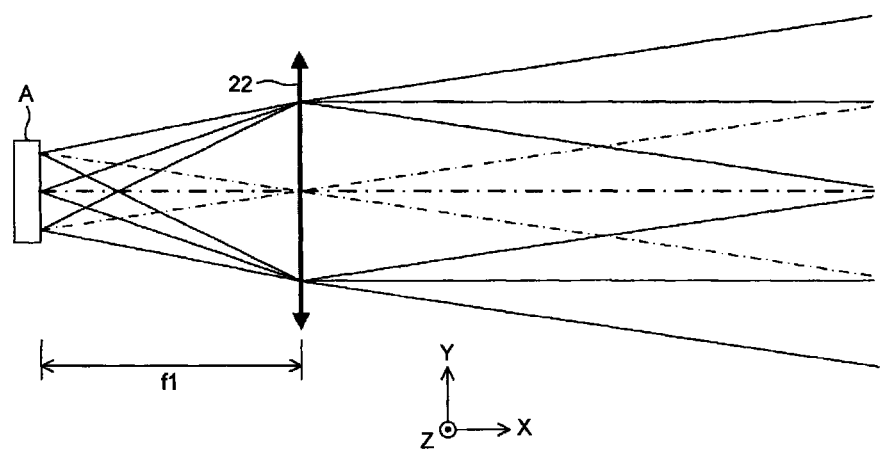
FIG. 14 is a diagram for explaining light having passed through the coupling lens 22 in the arrangement example 1.

In this arrangement example 1, as indicated in FIG. 13, the coupling lens 22 is arranged at a position at which a distance to the light source 21 corresponds with a focal length (f1) of the coupling lens 22 in the X axis direction.

In this case, light emitted from one emitting unit of the light source 21 is made into approximately parallel light by the coupling lens 22. However, because more than one emitting unit included in the light emitting unit group A is turned on at the same time, light emitted from the light emitting unit group A becomes divergent light after passing through the coupling lens 22 (refer to FIG. 14). A position at which a conjugate image of the light source 21 is formed by the coupling lens 22 is infinity.

Figure 15:
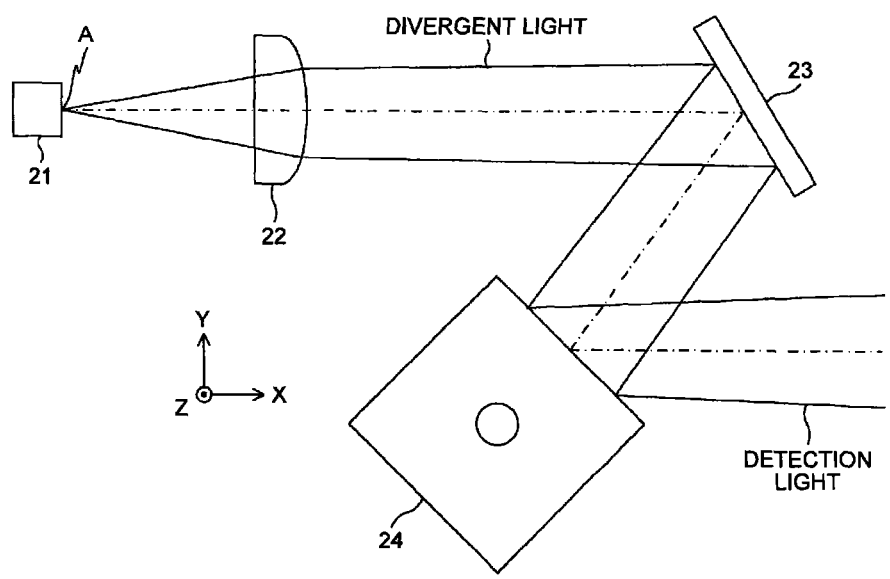
FIG. 15 is a diagram (Part 1) for explaining an optical path of light emitted from a light emitting unit group A in the arrangement example 1.
Figure 16:
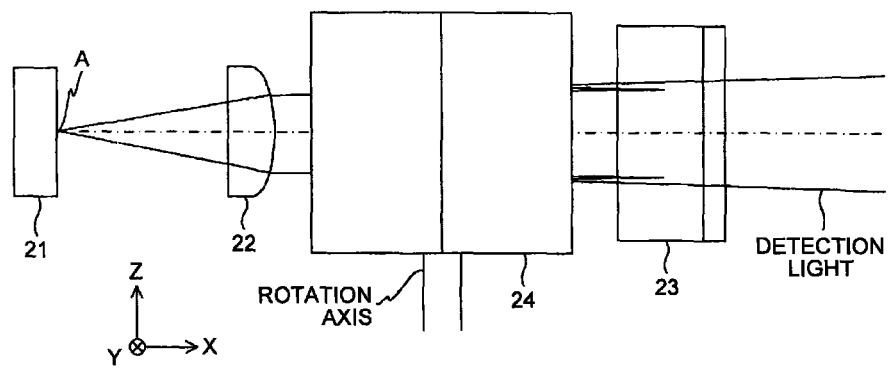
FIG. 16 is a diagram (Part 2) for explaining the optical path of light emitted from the light emitting unit group A in the arrangement example 1.

One example of an optical path of light emitted from one of the light emitting unit groups A of the light source 21 is indicated in FIG. 15 and FIG. 16.

Figure 17:
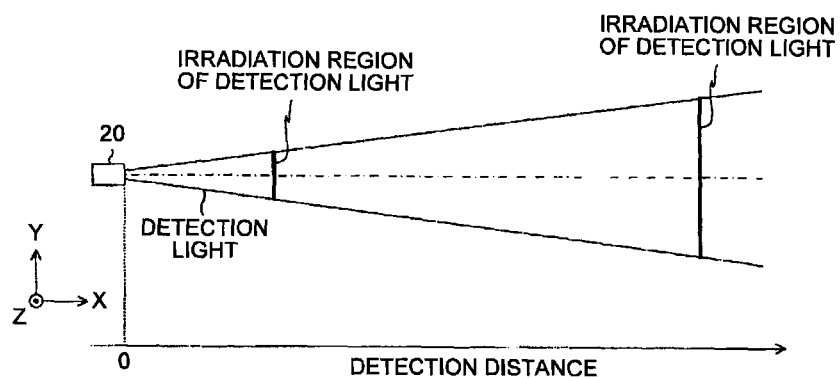
FIG. 17 is a diagram for explaining an irradiation region of detection light in the arrangement example 1.

Because detection light emitted from the laser radar 20 is divergent light, as indicated in FIG. 17 as an example, the size of an irradiation region of the detection light varies according to a detection distance. In the following, to avoid complication, the irradiation region of the detection light is also simply referred to as an irradiation region.

Figure 18:
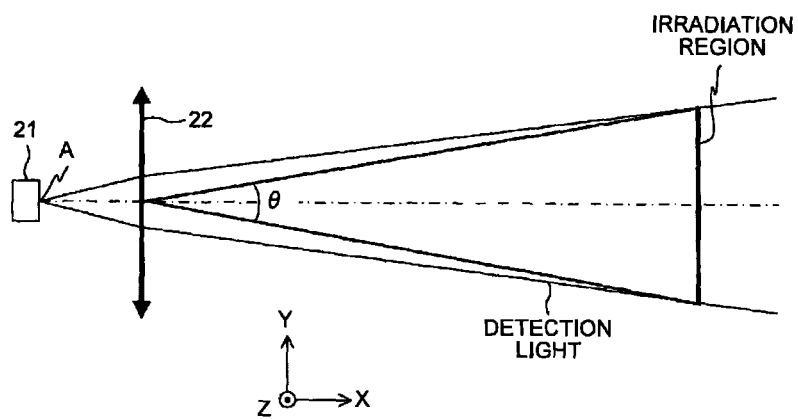
FIG. 18 is a diagram for explaining definition of an irradiation angle θ.
Figure 19:
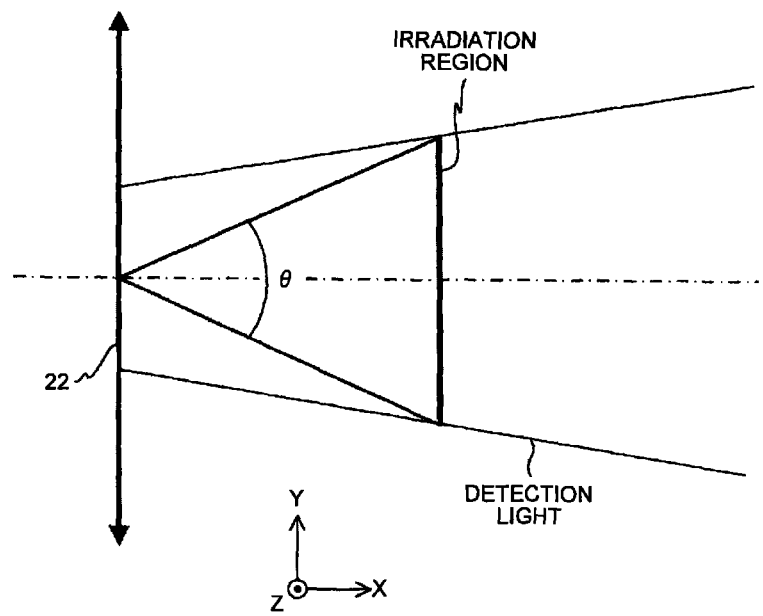
FIG. 19 is a diagram (Part 1) for explaining the irradiation angle θ in the arrangement example 1.
Figure 20:
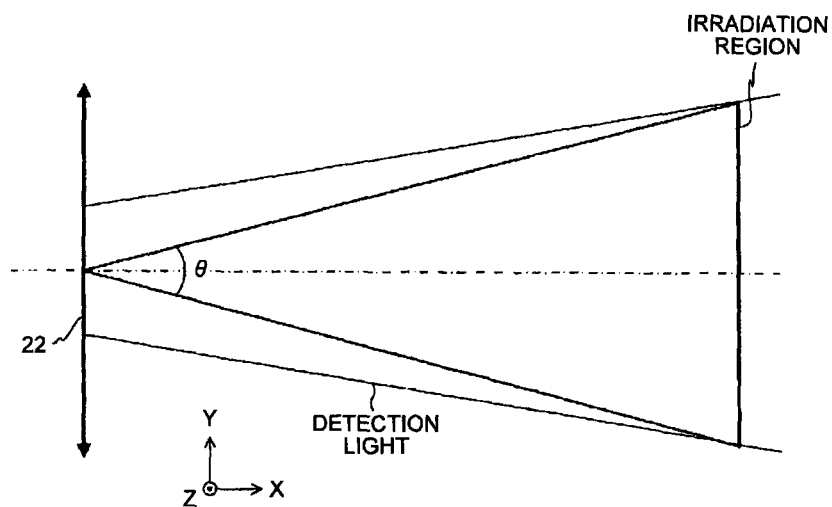
FIG. 20 is a diagram (Part 2) for explaining the irradiation angle θ in the arrangement example 1.

As indicated in FIG. 18 as an example, the spread angle θ of the irradiation region when the center of the coupling lens 22 is an eyepoint is defined as an irradiation angle. This irradiation angle θ increases as the detection distance decreases (refer to FIG. 19 and FIG. 20).

Figure 21:
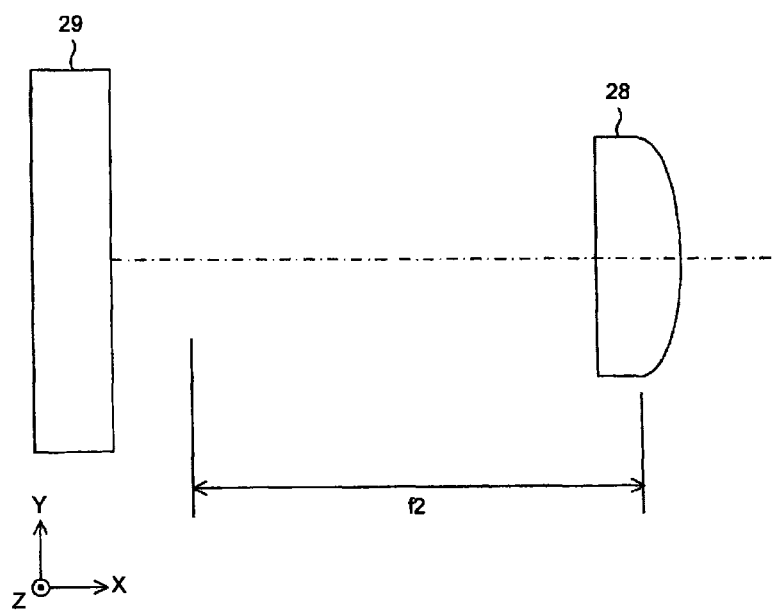
FIG. 21 is a diagram for explaining a position of an image forming lens 28 in the arrangement example 1.
Figure 22:
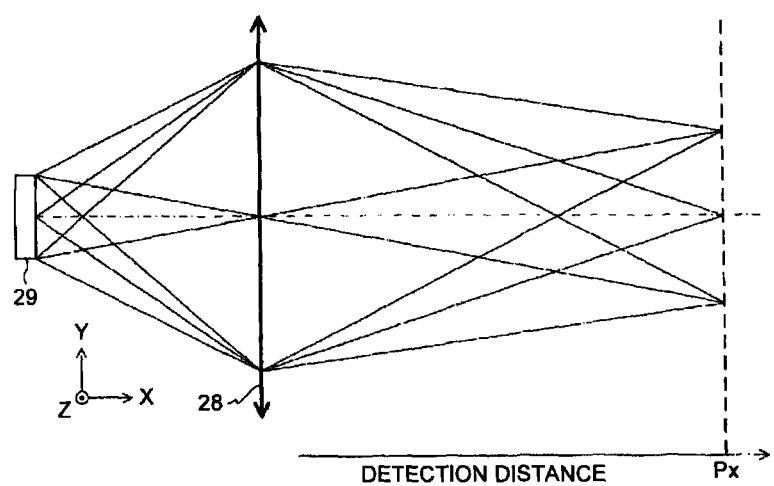
FIG. 22 is a diagram for explaining a conjugate position of a photo detector 29 in the arrangement example 1.

The image forming lens 28 is arranged, as indicated in FIG. 21, at a position at which a distance to the photo detector 29 is larger than a focal length (f2) of the image forming lens 28 in the X axis direction, and is arranged such that the photo detector 29 forms an image by the image forming lens 29 at a position at which a distance from the laser radar 20 in the X axis direction is $P_x$ (refer to FIG. 22). That is, $P_x$ is a position at which a conjugate image of the photo detector 29 is formed by the image forming lens 28. As an example, $P_x$=80 m.

Figure 23:
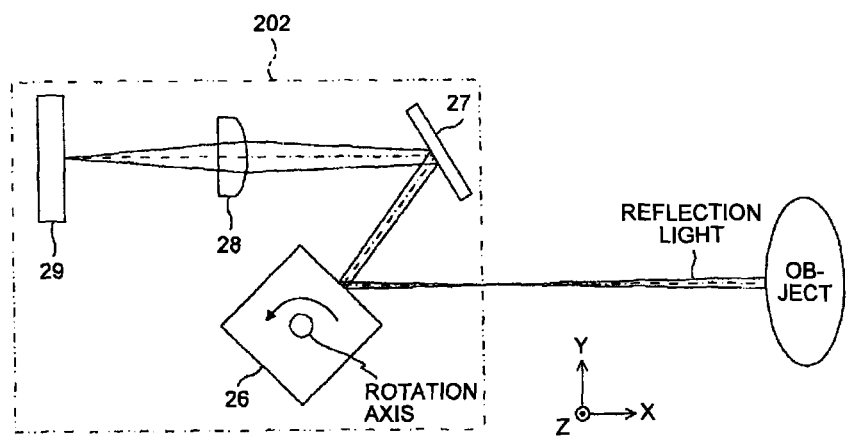
FIG. 23 is a diagram (Part 1) for explaining an optical path of reflection light from an object in the arrangement example 1.
Figure 24:
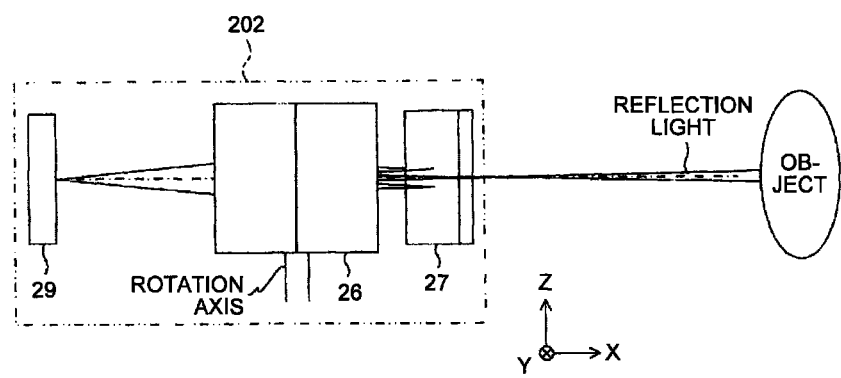
FIG. 24 is a diagram (Part 2) for explaining an optical path of reflection light from an object in the arrangement example 1.

An example of an optical path of reflection light from an object is indicated in FIG. 23 and FIG. 24.

That is, in the arrangement example 1, the coupling lens 22 and the image forming lens 29 are arranged such that the conjugate image of the light source 21 is formed at infinity, and the conjugate image of the photo detector 29 is formed in proximity to the laser radar 20.

Figure 25:
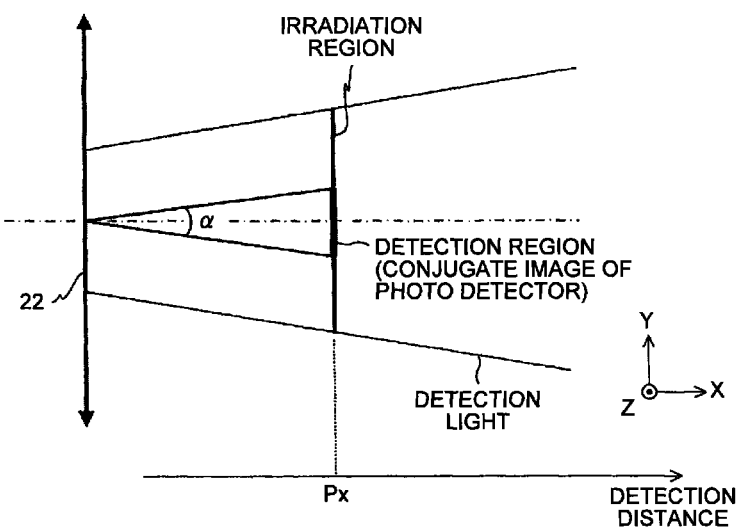
FIG. 25 is a diagram for explaining relation between an irradiation region and a detection region of the photo detector 29 in the conjugate position in the arrangement example 1.

For example, as indicated in FIG. 25, when an object is present at a position at which the distance from the laser radar 20 is $P_x$ in the X axis direction and is present within the conjugate image of the photo detector 29 in the Y axis direction, the photo detector 29 can receive reflection light from the object. In this example, a region in which the conjugate image of the photo detector 29 is formed is the "detection region".

Figure 26:
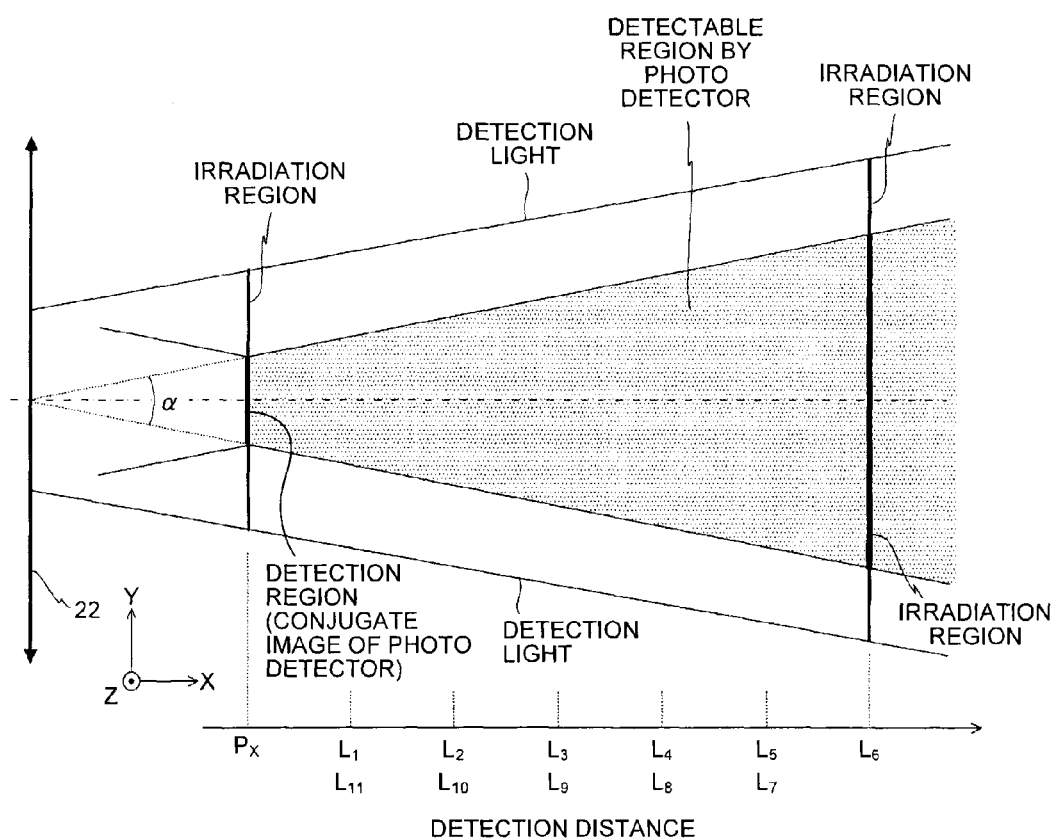
FIG. 26 is a diagram for explaining a detection angle α in the arrangement example 1.

A spread angle α of a detection region when the center of the coupling lens 22 is the eyepoint is defined as a detection angle. At a position at which the detection distance is $P_x$ or larger, as indicated in FIG. 26, the detection angle α is substantially constant. Moreover, within a range of a detection distance required for the laser radar 20, the size of a detection region is smaller than the irradiation range. Therefore, the laser radar 20 can improve detection resolution compared to conventional laser radars.

At a position at which the detection distance is smaller than $P_x$, the size of the detection region is larger than the size of the detection region at $P_x$. That is, the size of the detection region is minimum at $P_x$. Therefore, $P_x$ may be set as a minimum detection distance. In this case, processing of acquiring object information (for example, various kinds of calculation processing) at the object-information acquiring unit 203 can be simplified.

<<Arrangement Example 2 of Coupling Lens 22 and Image Forming Lens 29>>

Figure 27:
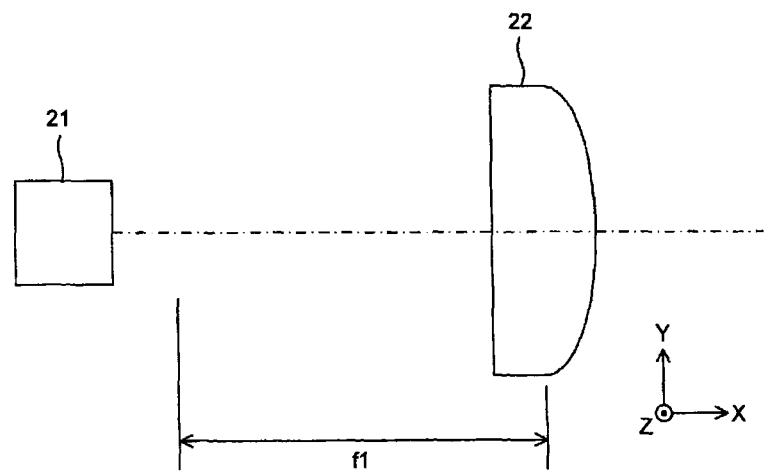
FIG. 27 is a diagram for explaining a position of the coupling lens 22 in an arrangement example 2.
Figure 28:
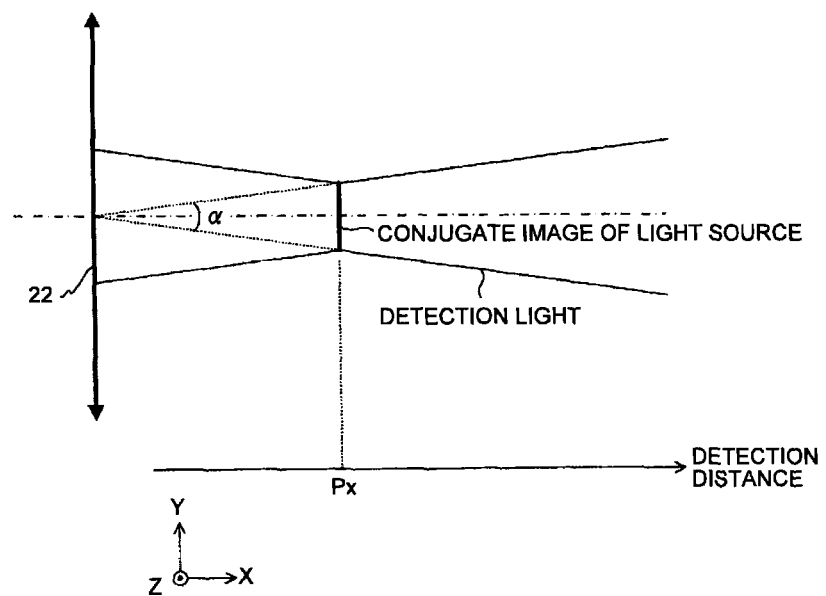
FIG. 28 is a diagram for explaining detection light in the arrangement example 2.

In the arrangement example 2, as indicated in FIG. 27, the coupling lens 22 is arranged at a position at which a distance to the light source 21 is larger than the focal length f1 of the coupling lens 22 in the X axis direction, and is arranged, as indicated in FIG. 28, such that the conjugate image of the light source 21 is formed at $P_x$ described above by the coupling lens 22.

Figure 29:
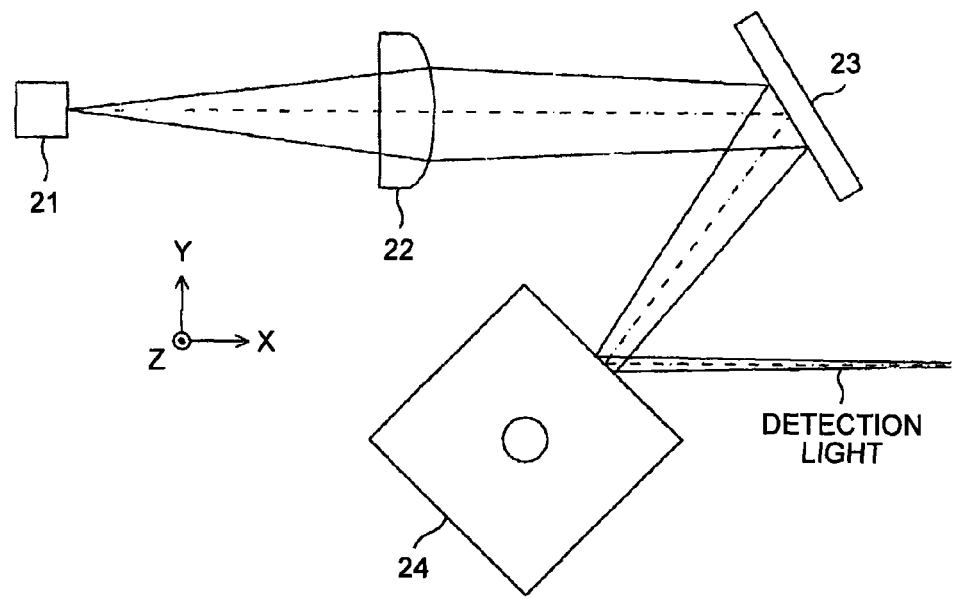
FIG. 29 is a diagram (Part 1) for explaining an optical path of light emitted from the light emitting unit group A in the arrangement example 2.
Figure 30:
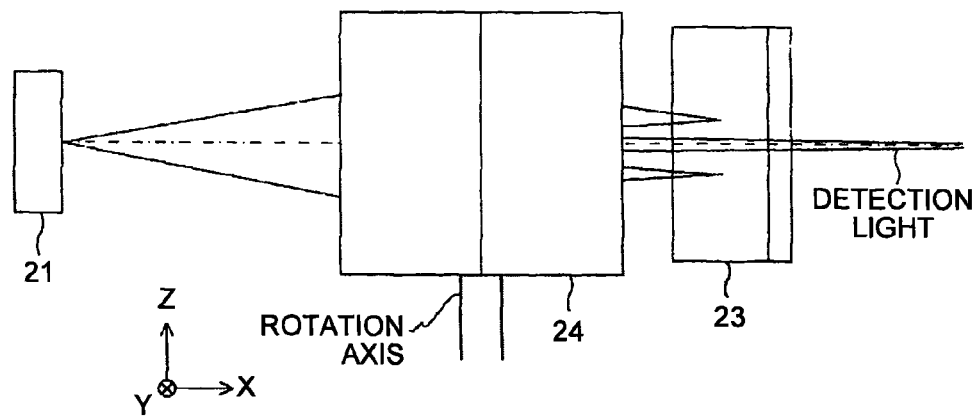
FIG. 30 is a diagram (Part 2) for explaining the optical path of light emitted from the light emitting unit group A in the arrangement example 2.

One example of an optical path of light emitted from one of the light emitting unit groups A of the light source 21 is indicated in FIG. 29 and FIG. 30.

Figure 31:
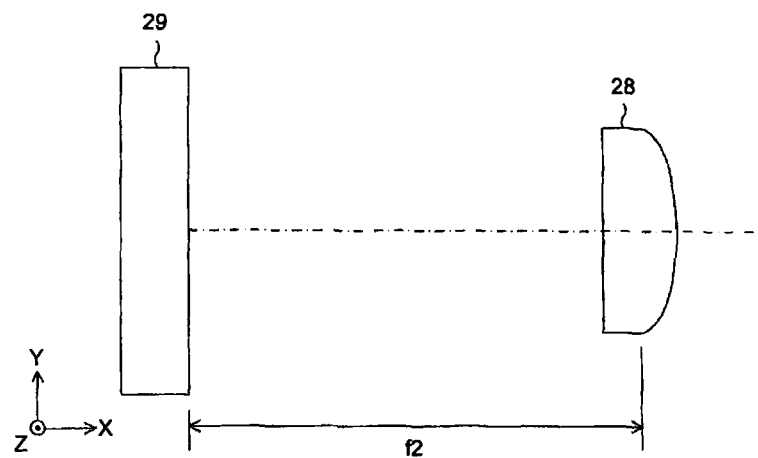
FIG. 31 is a diagram for explaining a position of the image forming lens 28 in the arrangement example 2.

The image forming lens 28 is arranged, as indicated in FIG. 31, at a position at which a distance to the photo detector 29 corresponds with the focal length (f2) of the image forming lens 28 in the X axis direction.

Figure 32:
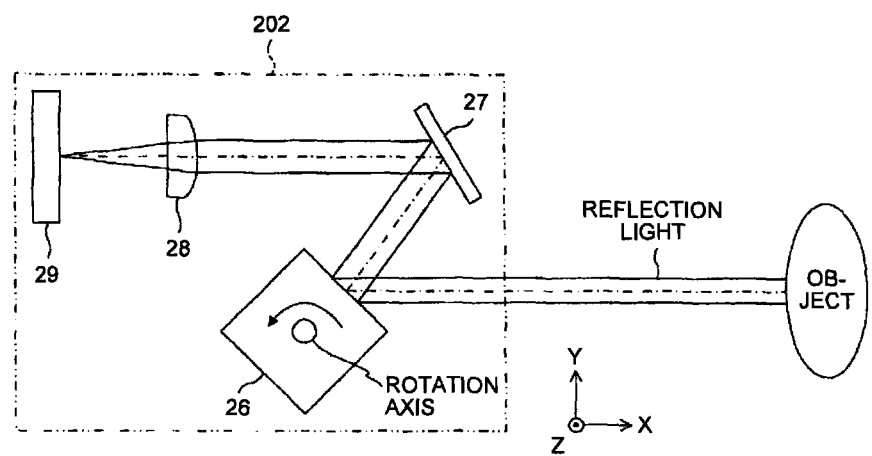
FIG. 32 is a diagram (Part 1) for explaining an optical path of reflection light from an object in the arrangement example 2.
Figure 33:
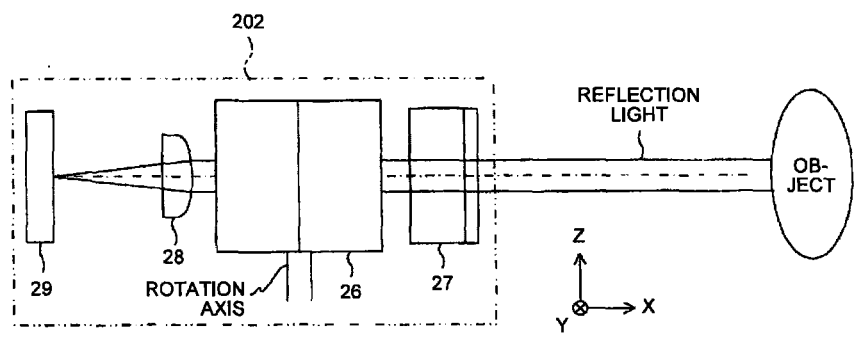
FIG. 33 is a diagram (Part 2) for explaining an optical path of reflection light from an object in the arrangement example 2.

An example of an optical path of reflection light from an object is indicated in FIG. 32 and FIG. 33.

That is, in the arrangement example 2, the coupling lens 22 and the image forming lens 29 are arranged such that the conjugate image of the light source 21 is formed in proximity to the laser radar 20, and the conjugate image of the photo detector 29 is formed at infinity.

Figure 34:
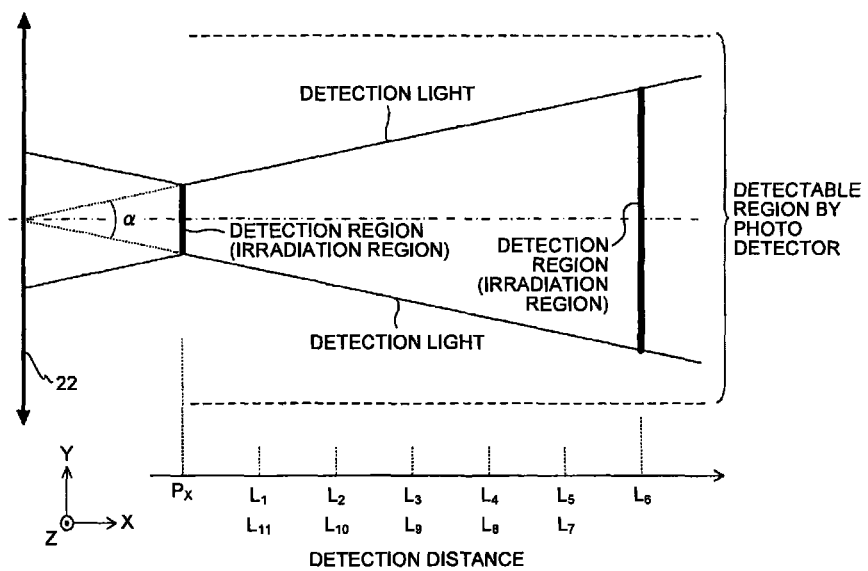
FIG. 34 is a diagram for explaining relation between detection light and a region, light from which can be received by the photo detector 29 in the arrangement example 2.

FIG. 34 indicates relation between detection light and a region from which the photo detector 29 can receive light. In the arrangement example 2, all of reflection light from an object can be received by the photo detector 29. That is, the irradiation region and the detection region coincide with each other.

The size of the detection region in the arrangement example 2 is the same as the size of the detection region in the arrangement example 1, and effects similar to those of the arrangement example 1 described above can also be obtained in this arrangement example 2.

In other words, a region in which an object can be detected is a region in which an image of the light source 21 (hereinafter, also "light source image") and an image of the photo detector 29 (hereinafter, also "detector image") overlap with each other. For example, as the above arrangement example 1, even if the position of an object is within the region of the light source image, if it is outside the region of the detector image, reflection light from the object is not introduced to the photo detector 29, and therefore the object is not detected. Furthermore, as the above arrangement example 2, even if the position of an object is within the region of the detector image, if it is outside the region of the light source image, light (detection light) emitted from the light source 21 is not irradiated to the object, and therefore reflection light is not generated and light detectable by the photo detector 29 is not present.

<<Configuration Example 1 of Light Source 21>>

In this configuration example 1, the light source 21 has 28 light emitting unit groups A. In each of the light emitting unit groups A, 240 light emitting units are arranged along the Y axis direction, and 240 light emitting units are arranged along the Z axis direction. Accordingly, each of the light emitting unit groups A has 57600 (=240×240) light emitting units. d2 is approximately 0.02 millimeters (mm), d3 is approximately 0.7 micrometers (μm), and d4 is approximately 1 μm.

Figure 35:
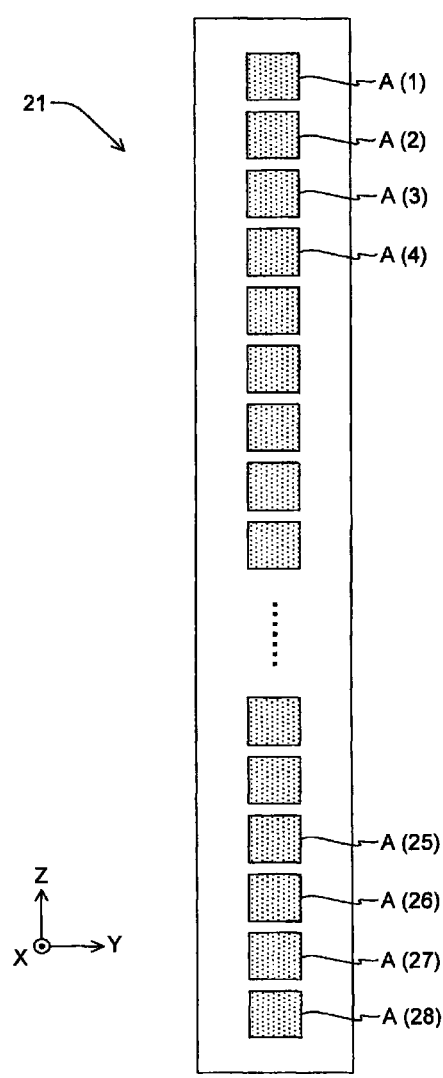
FIG. 35 is a diagram for explaining light emitting unit groups in a configuration example 1 of a light source 21.

When it is necessary to distinguish the 28 light emitting unit groups, as indicated in FIG. 35, expressing alignment sequence in the −Z axis direction with i (1≤i≤28), it is indicated as A(i).

Figure 36:
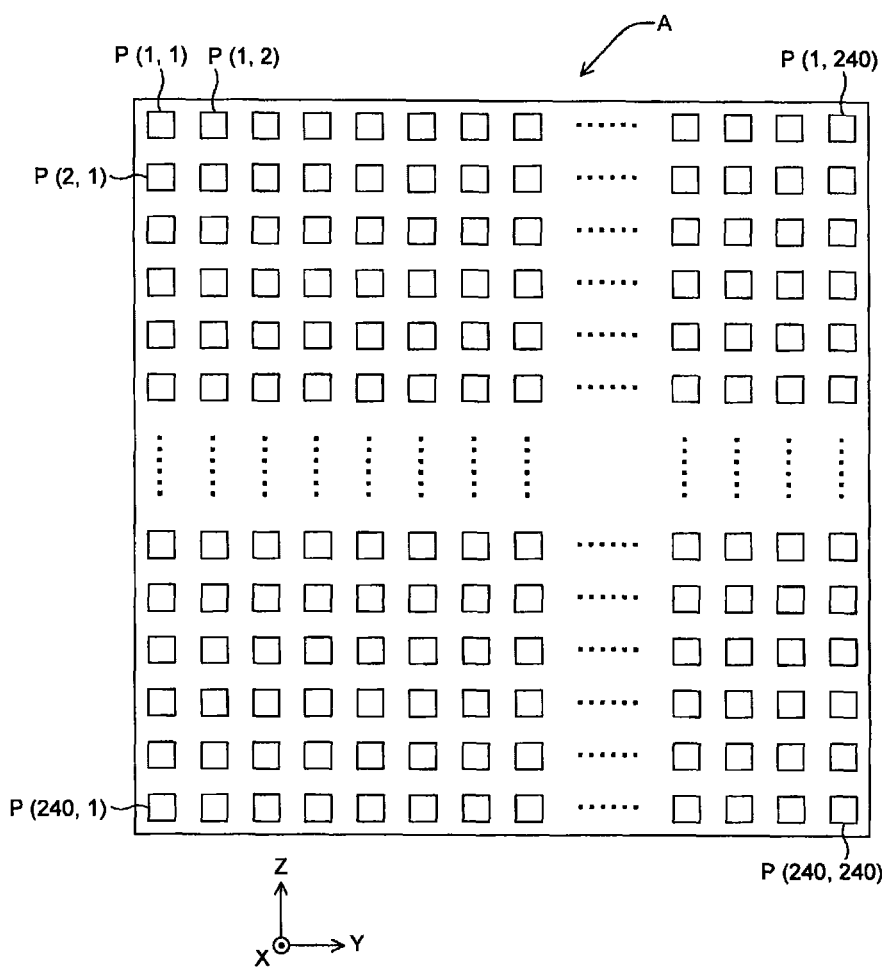
FIG. 36 is a diagram for explaining light emitting units included in the light emitting unit group in the configuration example 1 of the light source 21.

Moreover, when it is necessary to distinguish the 57600 light emitting units, as indicated in FIG. 36, expressing alignment sequence in the −Z axis direction with j ($1 \leq j \leq 240$), and alignment sequence in the +Y direction with k ($1 \leq k \leq 240$), it is indicated as P(j, k).

Figure 37:
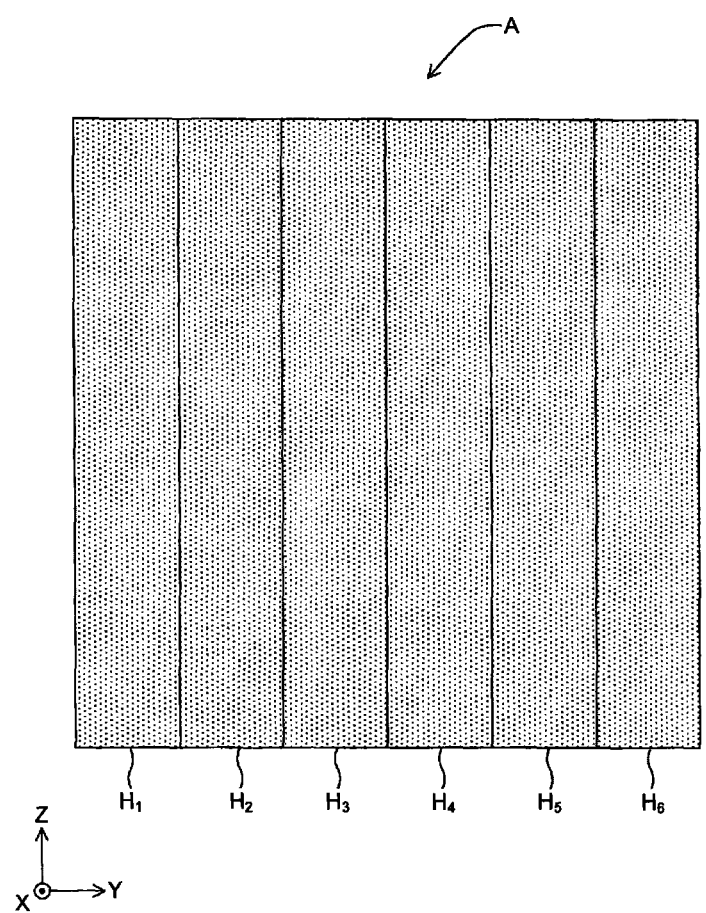
FIG. 37 is a diagram for explaining grouping of the light emitting units included in the light emitting unit group in the configuration example 1 of the light source 21.

The light emitting units included in a light emitting unit group are grouped into six groups ($H_1$ to $H_6$) as indicated in FIG. 37. In this example, 9600 light emitting units at P(1, 1) to P(240, 40) are included in the group $H_1$, 9600 light emitting units at P(1, 41) to P(240, 80) are included in the group $H_2$, 9600 light emitting units at P(1, 81) to P(240, 120) are included in the group $H_3$, 9600 light emitting units at P(1, 121) to P(240, 160) are included in the group $H_4$, 9600 light emitting units at P(1, 161) to P(240, 200) are included in the group $H_5$, and 9600 light emitting units at P(1, 201) to P(240, 240) are included in the group $H_6$.

That is, a scanning range is divided into 2M−1 partial regions (M=6 in this example), and light emitting units included in a light emitting unit group are grouped into M groups.

In this case, when light emission power of a single light emitting unit is 1 milliwatt (mW), the light emission power of one group is 9.6 watts (W).

Figure 38:
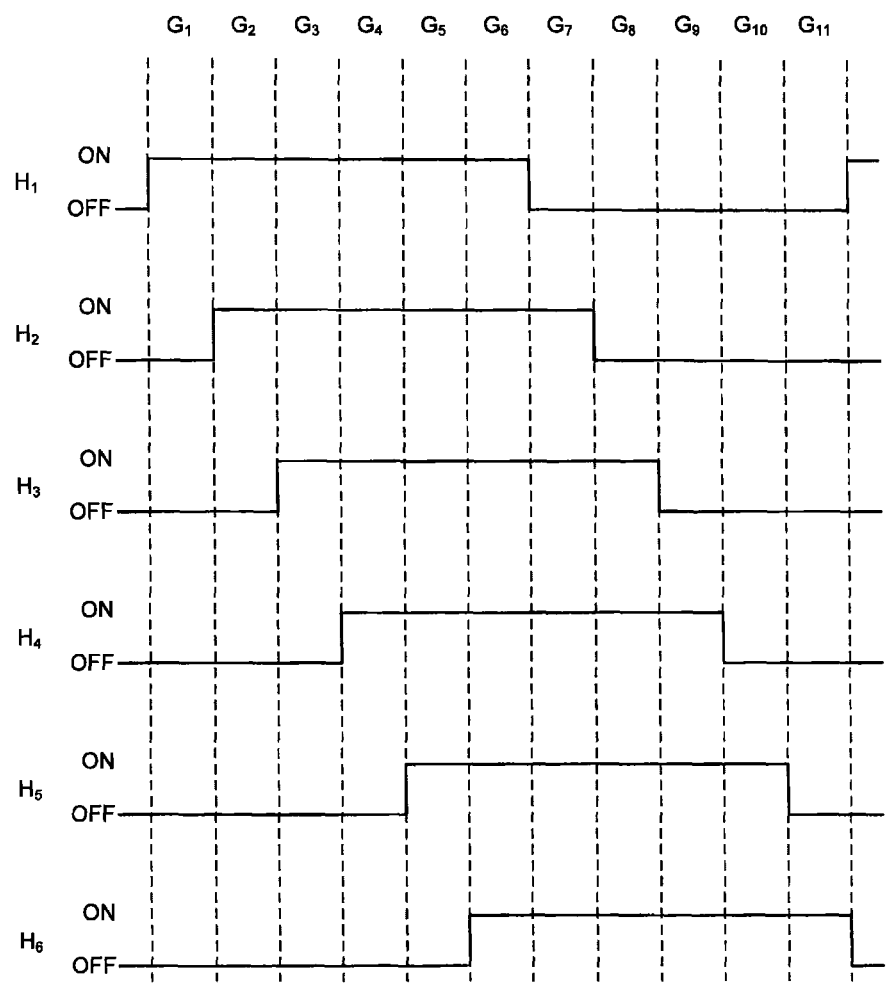
FIG. 38 is a diagram for explaining turning on timing of each group in the configuration example 1 of the light source 21.

FIG. 38 indicates turning on timing of each group (also referred to as "light-source control method 1"). In this example, when the partial region $G_1$ is scanned, the light emitting units included in the group $H_1$ are turned on, and when the partial region $G_2$ is scanned, the light emitting units included in the groups $H_1$ and $H_2$ are turned on. Moreover, when the partial region $G_3$ is scanned, the light emitting units included in the groups $H_1$, $H_2$, and $H_3$ are turned on, and when the partial region $G_4$ is scanned, the light emitting units included in the groups $H_1$, $H_2$, $H_3$, and $H_4$ are turned on.

When the partial region $G_5$ is scanned, the light emitting units included in the groups $H_1$, $H_2$, $H_3$, $H_4$, and $H_5$ are turned on, and when the partial region $G_6$ is scanned, the light emitting units included in the groups $H_1$, $H_2$, $H_3$, $H_4$, $H_5$, and $H_6$ are turned on. Furthermore, when the partial region $G_7$ is scanned, the light emitting units included in the groups $H_2$, $H_3$, $H_4$, $H_5$, and $H_6$ are turned on, and when the partial region $G_8$ is scanned, the light emitting units included in the groups $H_3$, $H_4$, $H_5$, and $H_6$ are turned on.

When the partial region $G_9$ is scanned, the light emitting units included in the groups $H_4$, $H_5$, and $H_6$ are turned on, and when the partial region $G_{10}$ is scanned, the light emitting units included in the groups $H_5$, and $H_6$ are turned on. Moreover, when the partial region $G_{11}$ is scanned, the light emitting units included in the group $H_6$ are turned on.

That is, as the direction of travel of the detection light shifts from the first partial region among 2M−1 partial regions to the M-th partial region, the first group to the M-th group among the M groups are sequentially turned on, and as the direction of travel of the detection light shifts from the M+1-th partial region to the 2M−1-th partial region, the first group to the M−1-th group among the M groups are sequentially turned off.

Thus, deterioration of a light source can be suppressed without deteriorating the detection resolution.

In this case, the light emission power of the light source 21 when the partial region $G_1$ and the partial region $G_{11}$ are scanned is 9.6 W, the light emission power of the light source 21 when the partial region $G_2$ and the partial region $G_{10}$ are scanned is 19.2 (=2×9.6) W, and the light emission power of the light source 21 when the partial region $G_3$ and the partial region $G_9$ are scanned is 28.8 (=3×9.6) W.

Moreover, the light emission power of the light source 21 when the partial region $G_4$ and the partial region $G_8$ are scanned is 38.4 (=4×9.6) W, and the light emission power of the light source 21 when the partial region $G_5$ and the partial region $G_7$ are scanned is 48.0 (=5×9.6) W, and the light emission power of the light source 21 when the partial region $G_6$ is scanned is 57.6 (=6×9.6) W.

In the following, a group that is turned on when light reflected on a mirror surface of the first rotation mirror 24 scans the partial region $G_m$ is also referred to as a group corresponding to the partial region $G_m$.

The group corresponding to the partial region $G_1$ is the group $H_1$, and the groups corresponding to the partial region $G_2$ are the groups $H_1$, and $H_2$. The groups corresponding to the partial region $G_3$ are the groups $H_1$, $H_2$ and $H_3$, and the groups corresponding to the partial region $G_4$ are the groups $H_1$, $H_2$, $H_3$, and $H_4$. The groups corresponding to the partial region $G_5$ are the groups $H_1$, $H_2$, $H_3$, $H_4$, and $H_5$, and the groups corresponding to the partial region $G_6$ are the groups $H_1$, $H_2$, $H_3$, $H_4$, $H_5$, and $H_6$.

Moreover, the groups corresponding to the partial region $G_7$ are the groups $H_2$, $H_3$, $H_4$, $H_5$, and $H_6$, and the groups corresponding to the partial region $G_8$ are the groups, $H_4$, $H_5$, and $H_6$. The groups corresponding to the partial region $G_9$ are the groups $H_4$, $H_5$, and $H_6$, and the groups corresponding to the partial region $G_{10}$ are the groups $H_5$, and $H_6$. The group corresponding to the partial region $G_{11}$ is the group $H_6$.

Although the group $H_1$ is turned on when the partial region $G_1$ is scanned in the above explanation, the group $H_6$ may be turned on when the partial region $G_1$ is scanned. Which is preferable is determined based on the following point of view.

Figure 39:
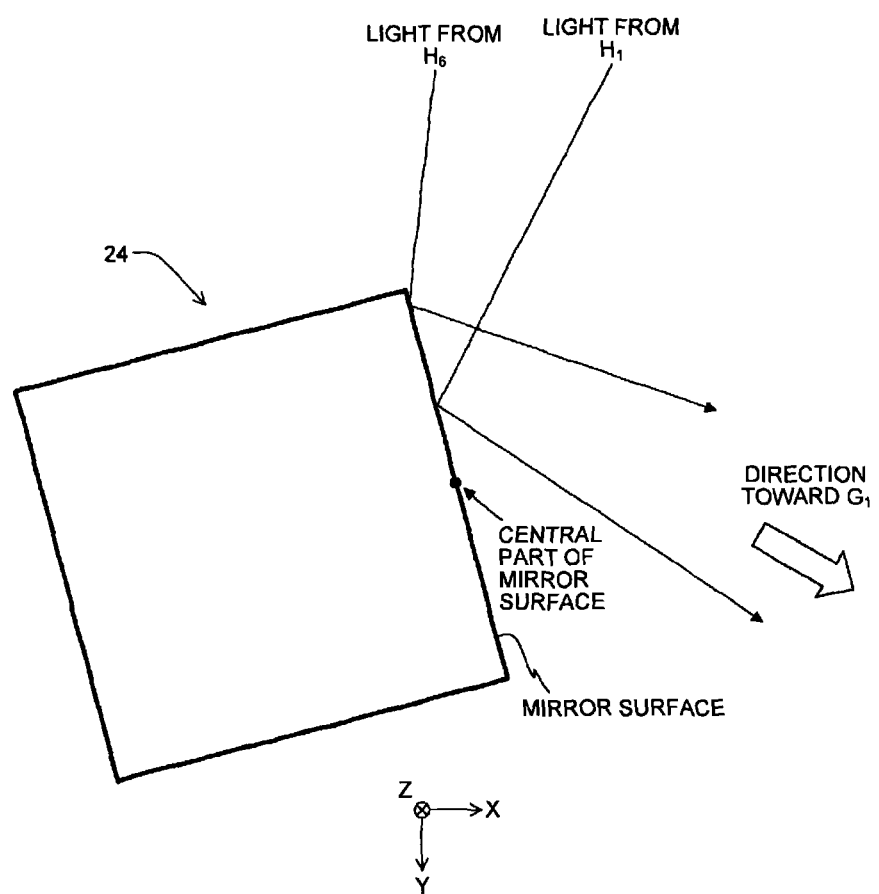
FIG. 39 is a diagram (Part 1) for explaining reflection positions of light from a group $H_1$ and light from a group $H_6$ on a mirror surface of the first rotation mirror.
Figure 40:
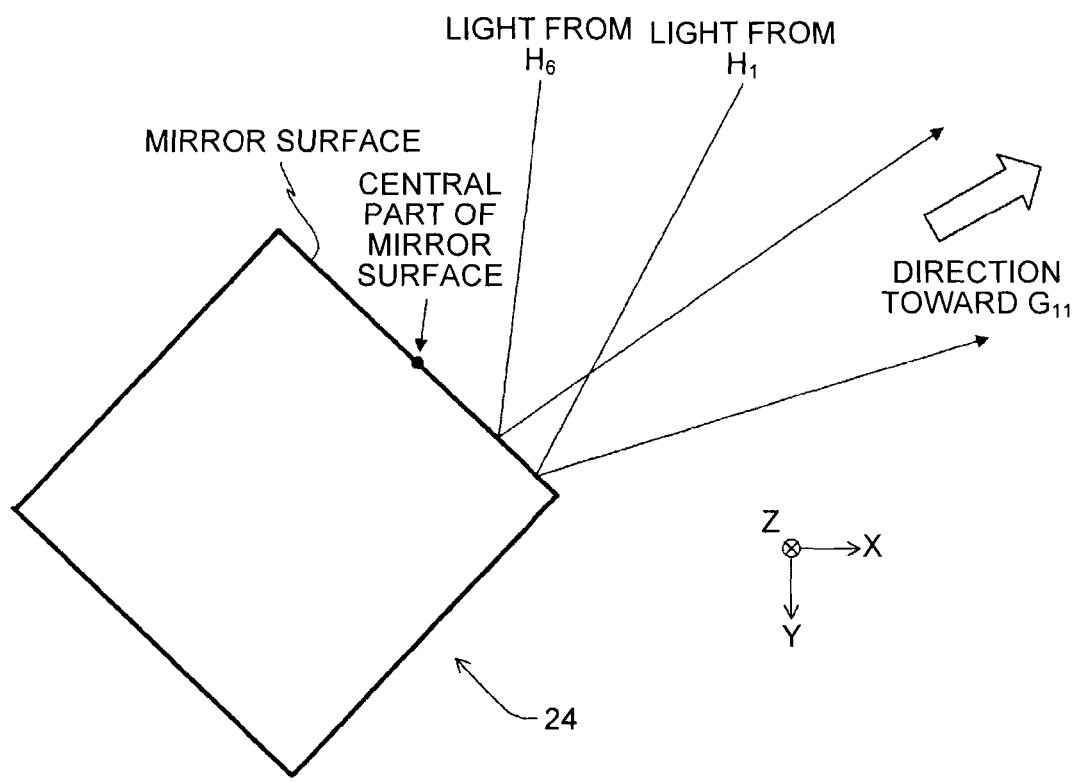
FIG. 40 is a diagram (Part 2) for explaining reflection positions of light from the group $H_1$ and light from the group $H_6$ on a mirror surface of the first rotation mirror.

FIG. 39 indicates a rotation position of the first rotation mirror 24 when the partial region G1 is scanned, and a reflection position of light from the group $H_1$ and a reflection position of light from the group $H_6$ on a mirror surface of the first rotation mirror 24 at that time. As indicated, when the reflection position of light from the group $H_1$ is positioned closer to the central part of the mirror surface than the reflection position of light from the group $H_6$, the group corresponding to the partial region $G_1$ is set to the group $H_1$. Thus, when the partial region $G_{11}$ is scanned, the reflection position of light emitted from the group $H_6$ is naturally positioned closer to the central part of the mirror surface than the reflection position of light from the group H1 as indicated in FIG. 40, and concern about vignetting of light on the mirror surface is eliminated.

Figure 41:
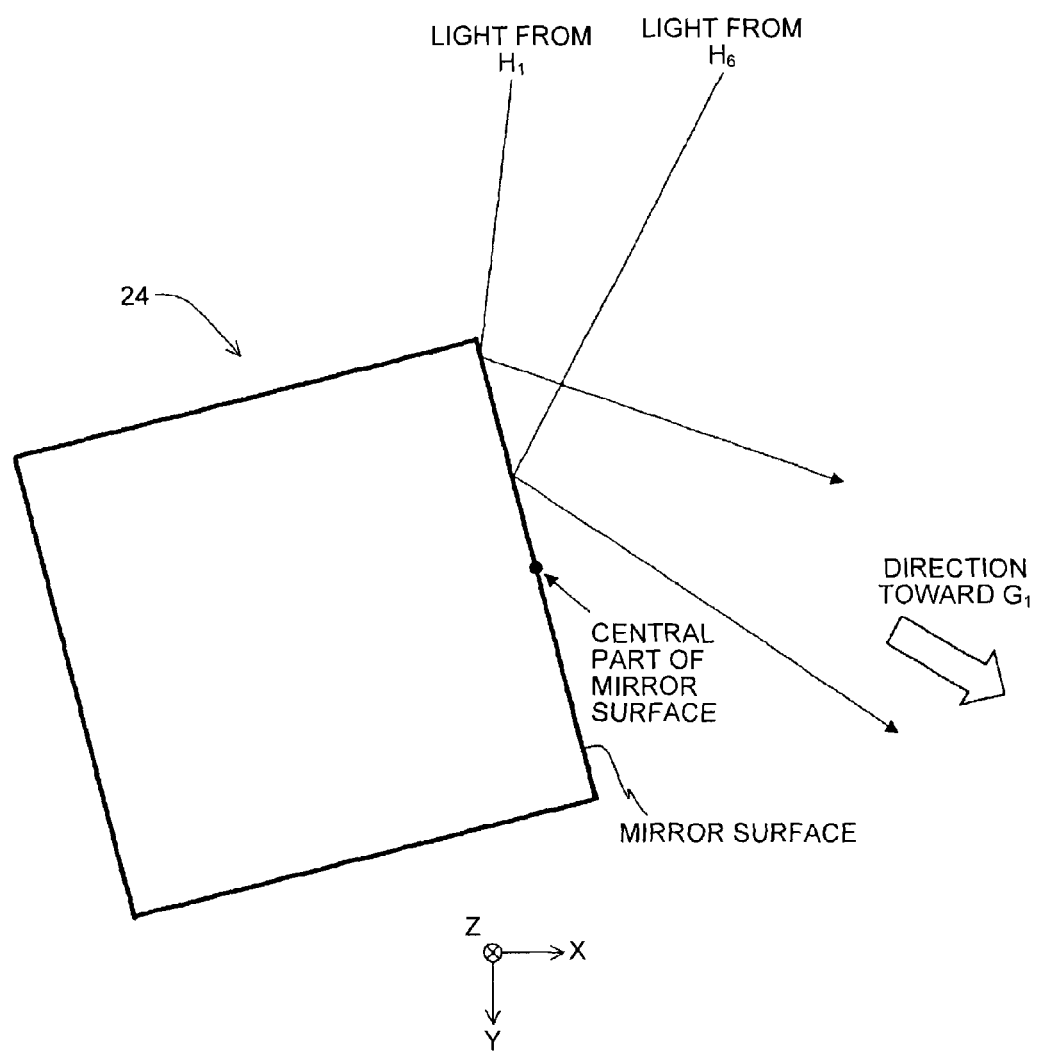
FIG. 41 is a diagram (Part 3) for explaining reflection positions of light from the group $H_1$ and light from the group $H_6$ on a mirror surface of the first rotation mirror.

On the other hand, as indicated in FIG. 41, if the reflection position of light from the group $H_6$ is positioned closer to the central part of the mirror surface than the reflection position of light from the group $H_1$ when the partial region G1 is scanned, it is needless to say that the group corresponding to the partial region $G_1$ is set to the group $H_6$.

<<Configuration Example 2 of Light Source 21>>

Figure 42:
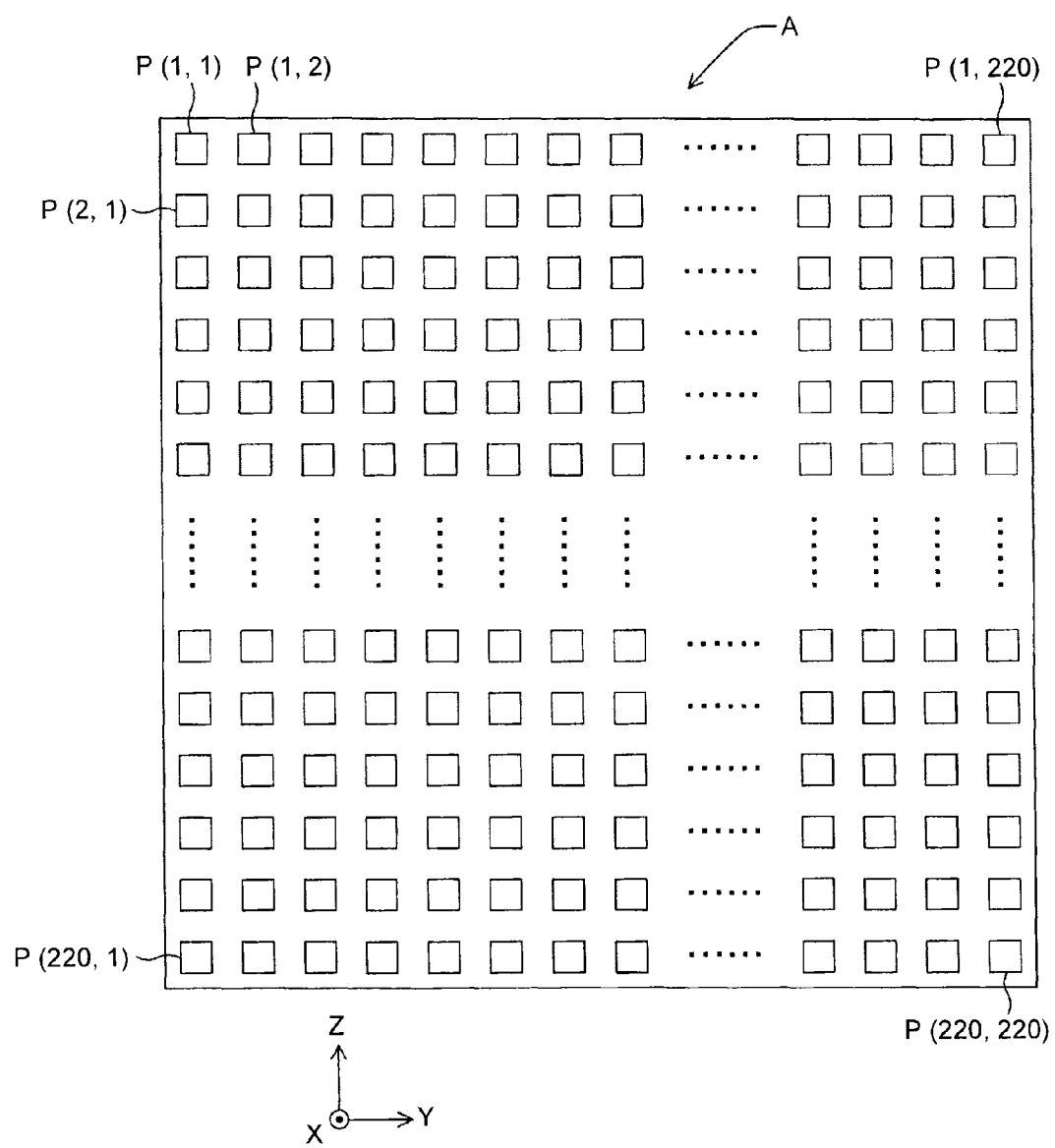
FIG. 42 is a diagram for explaining the light emitting units included in the light emitting unit group in a configuration example 2 of the light source 21.

In this configuration example 2, the light source 21 has 28 light emitting unit groups A. In each of the light emitting unit groups A, 220 light emitting units are arranged along the Y axis direction, and 220 light emitting units are arranged along the Z axis direction as indicated in FIG. 42.

Figure 43:
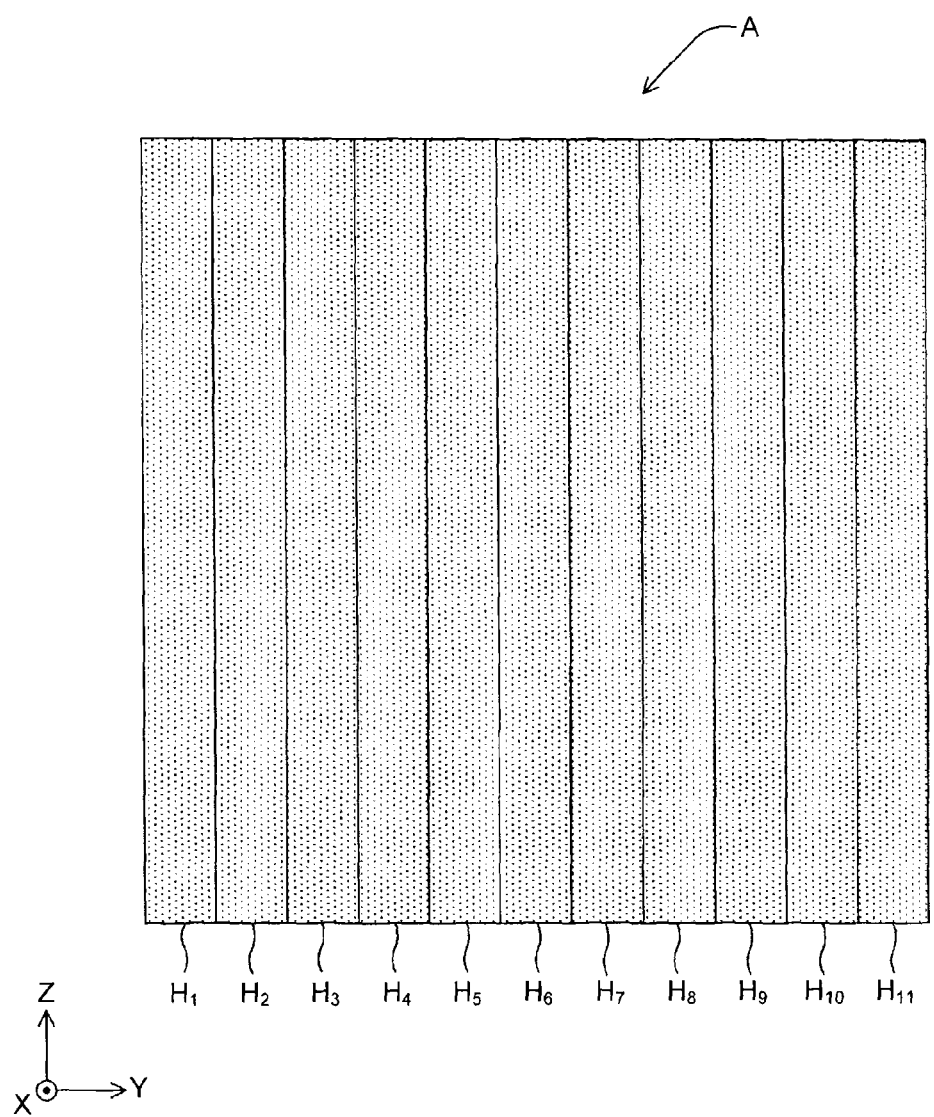
FIG. 43 is a diagram for explaining grouping of the light emitting units included in the light emitting unit group in the configuration example 2 of the light source 21.

The light emitting units included in a light emitting unit group are grouped into 11 groups ($H_1$ to $H_{11}$) as indicated in FIG. 43. In this example, 4400 light emitting units at P(1, 1) to P(220, 20) are included in the group $H_1$, 4400 light emitting units at P(1, 21) to P(220, 40) are included in the group $H_2$, 4400 light emitting units at P(1, 41) to P(220, 60) are included in the group $H_3$, 4400 light emitting units at P(1, 61) to P(220, 80) are included in the group $H_4$, 4400 light emitting units at P(1, 81) to P(220, 100) are included in the group $H_5$, and 4400 light emitting units at P(1, 101) to P(220, 120) are included in the group $H_6$.

Furthermore, 4400 light emitting units at P(1, 121) to P(220, 140) are included in the group $H_7$, 4400 light emitting units at P(1, 141) to P(220, 160) are included in the group $H_8$, 4400 light emitting units at P(1, 161) to P(220, 180) are included in the group $H_9$, 4400 light emitting units at P(1, 181) to P(220, 200) are included in the group $H_{10}$, and 4400 light emitting units at P(1, 201) to P(220, 220) are included in the group $H_{11}$.

That is, a scanning range is divided into 2M−1 (M=6 in this example) partial regions, and light emitting units included in a light emitting unit group are grouped into 2M−1 groups.

In this case, when light emission power of a single light emitting unit is 1 mW, the light emission power of one group is 4.4 W.

Figure 44:
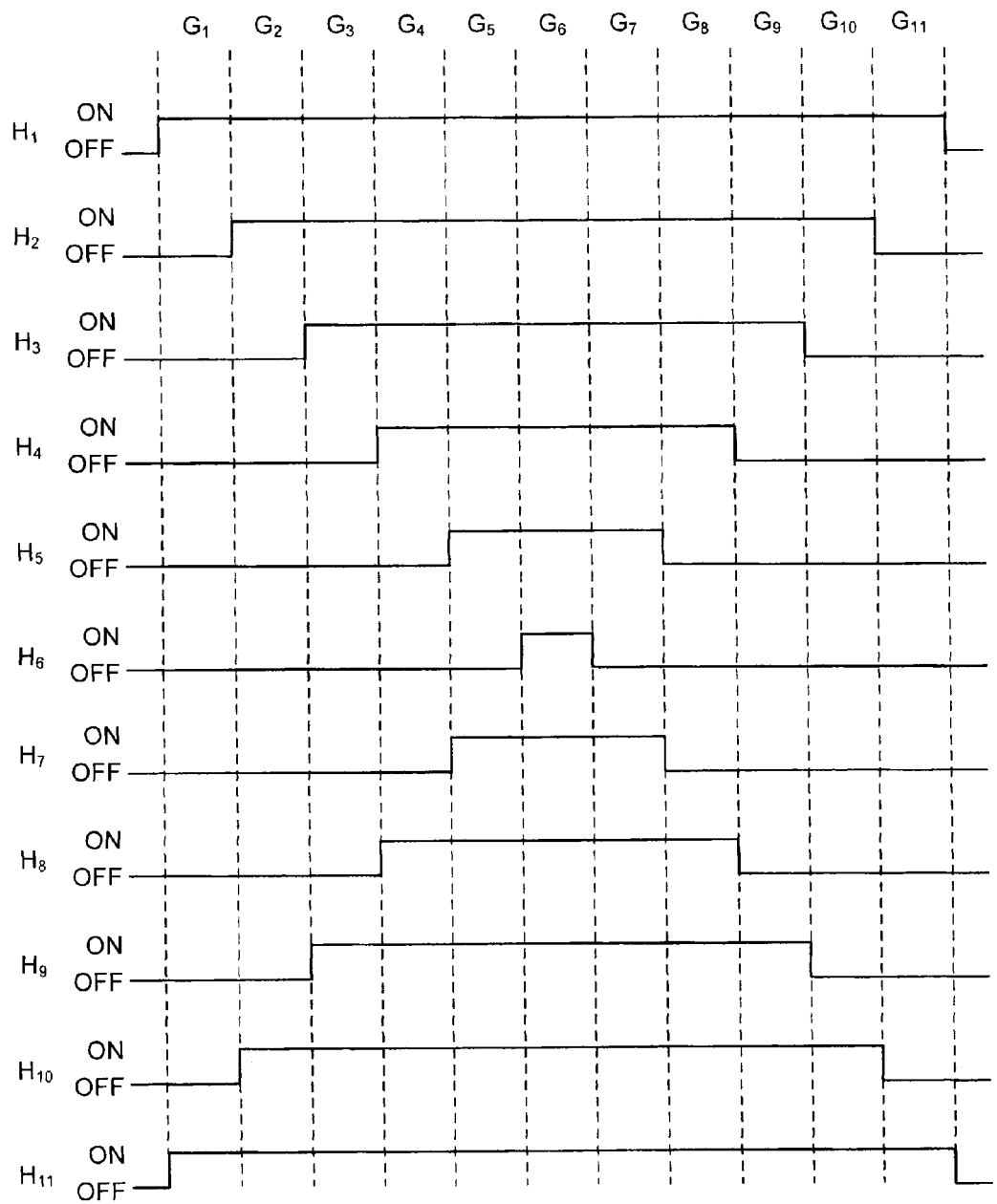
FIG. 44 is a diagram for explaining turning on timing of each group in the configuration example 2 of the light source 21.

FIG. 44 indicates turning on timing of each group (also referred to as "light-source control method 2"). In this example, when the partial region $G_1$ is scanned, the light emitting units included in the groups $H_1$ and $H_{11}$ are turned on, and when the partial region $G_2$ is scanned, the light emitting units included in the groups $H_1$, $H_2$, $H_{10}$, and $H_{11}$ are turned on. Moreover, when the partial region $G_3$ is scanned, the light emitting units included in the groups $H_1$, $H_2$, $H_3$, $H_9$, $H_{10}$, and $H_{11}$ are turned on, and when the partial region $G_4$ is scanned, the light emitting units included in the groups $H_1$, $H_2$, $H_3$, $H_4$, $H_8$, $H_9$, $H_{10}$, and $H_{11}$ are turned on.

When the partial region $G_5$ is scanned, the light emitting units included in the groups $H_1$, $H_2$, $H_3$, $H_4$, $H_5$, $H_7$, $H_8$, $H_9$, $H_{10}$, and $H_{11}$ are turned on, and when the partial region $G_6$ is scanned, the light emitting units included in the groups $H_1$, $H_2$, $H_3$, $H_4$, $H_5$, $H_6$, $H_7$, $H_8$, $H_9$, $H_{10}$, and $H_{11}$ are turned on. When the partial region $G_7$ is scanned, the light emitting units included in the groups $H_1$, $H_2$, $H_3$, $H_4$, $H_5$, $H_7$, $H_8$, $H_9$, $H_{10}$, and $H_{11}$ are turned on, and when the partial region $G_8$ is scanned, the light emitting units included in the groups $H_1$, $H_2$, $H_3$, $H_4$, $H_8$, $H_9$, $H_{10}$, and $H_{11}$ are turned on.

When the partial region $G_9$ is scanned, the light emitting units included in the groups $H_1$, $H_2$, $H_3$, $H_9$, $H_{10}$, and $H_{11}$ are turned on, and when the partial region $G_{10}$ is scanned, the light emitting units included in the groups $H_1$, $H_2$, $H_{10}$, and $H_{11}$ are turned on. When the partial region $G_{11}$ is scanned, the light emitting units included in the groups $H_1$ and $H_{11}$ are turned on.

In this case, the light emission power of the light source 21 when the partial region $G_1$ and the partial region $G_{11}$ are scanned is 8.8 (=2×4.4) W, the light emission power of the light source 21 when the partial region $G_2$ and the partial region $G_{10}$ are scanned is 17.6 (=4×4.4) W, and the light emission power of the light source 21 when the partial region $G_3$ and the partial region $G_9$ are scanned is 26.4 (=6×4.4) W.

Moreover, the light emission power of the light source 21 when the partial region $G_4$ and the partial region $G_8$ are scanned is 35.2 (=8×4.4) W, the light emission power of the light source 21 when the partial region $G_5$ and the partial region $G_7$ are scanned is 44.0 (=10×4.4) W, and the light emission power of the light source 21 when the partial region $G_6$ is scanned is 48.4 (=11×4.4) W.

The groups corresponding to the partial regions $G_1$ and $G_{11}$ are the groups $H_1$ and $H_{11}$, and the groups corresponding to the partial regions $G_2$ and $G_{10}$ are the groups, $H_1$, $H_2$, $H_{10}$, and $H_{11}$. The groups corresponding to the partial regions $G_3$ and $G_9$ are the groups $H_1$, $H_2$, $H_3$, $H_9$, $H_{10}$, and $H_{11}$, and the groups corresponding to the partial regions $G_4$ and $G_8$ are the groups $H_1$, $H_2$, $H_3$, $H_4$, $H_8$, $H_9$, $H_{10}$, and $H_{11}$.

Moreover, the groups corresponding to the partial regions $G_5$ and $G_7$ are the groups $H_1$, $H_2$, $H_3$, $H_4$, $H_5$, $H_7$, $H_8$, $H_9$, $H_{10}$, and $H_{11}$, and the groups corresponding to the partial region $G_6$ are the groups, $H_1$, $H_2$, $H_3$, $H_4$, $H_5$, $H_6$, $H_7$, $H_8$, $H_9$, $H_{10}$, and $H_{11}$.

Among light emitting units included in a light emitting unit group, a light emitting unit that is positioned in a central part in the arrangement is likely to be influenced thermally and electrically by light emitting units arranged therearound, and is most severely deteriorated. In the light-source control method 2, the group $H_6$ that is positioned in the central part in the arrangement is turned on only when the partial region $G_6$ is scanned, and therefore, the light emission amount can be varied according to a detection direction while suppressing deterioration of the light source.

Figure 45:
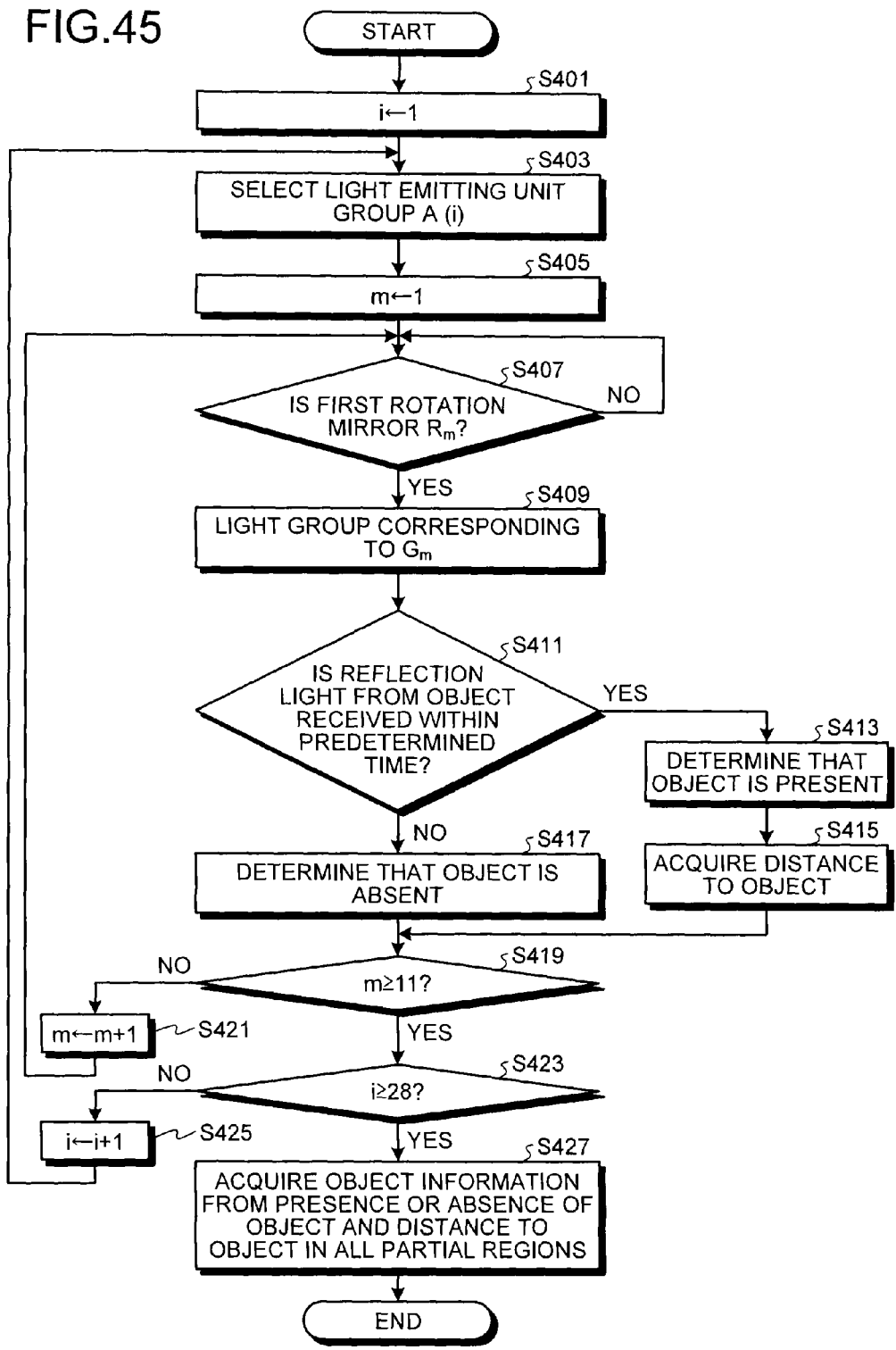
FIG. 45 is a flowchart for explaining operation of an object-information acquiring unit.

FIG. 45 indicates a flowchart of object-information acquiring processing that is performed by the object-information acquiring unit 203. The object-information acquiring unit 203 repeats this object-information acquiring processing at predetermined time intervals (for example, every 20 milliseconds) until the power is turned off.

In this example, a rotation angle of the first rotation mirror 24 when light reflected on a mirror surface of the first rotation mirror 24 starts scanning partial region $G_m$ (1≤m≤11) is $R_m$ (1≤m≤11).

At the first step S401, an initial value 1 is set to a variable i to identify a light emitting unit group.

At a next step S403, the light emitting unit group A(i) is selected.

At a next step S405, an initial value 1 is set to a variable m to identify a partial region.

At a next step S407, it is determined whether the rotation angle of the first rotation mirror 24 is $R_m$. When the rotation angle of the first rotation mirror 24 is not $R_m$, it is waited until the rotation angle becomes $R_m$. When the rotation angle of the first rotation mirror 24 is $R_m$, positive determination is made, and the process proceeds to step S409.

At this step S409, a group corresponding to the partial region $G_m$ is turned on. In this example, turning on duration is 20 nanoseconds; however, it is not limited thereto.

At a next step S411, it is determined whether reflection light from an object is received within predetermined time. When reflection light is received from an object within the predetermined time, positive determination is made, and the process proceeds to step S413. The predetermined time in this example is 2 microseconds; however, it is not limited thereto.

At this step S413, it is determined that an object is present.

At a next step S415, a distance to the object is acquired based on turning on timing of the light source 21 and light reception timing of the photo detector 29. The acquired distance to the object is stored in a memory (not illustrated) of the object-information acquiring unit 203 together with information indicating presence of an object, detected time, values of the variables i and m. The process then proceeds to step S419.

At step S411 described above, when reflection light is not received within the predetermined time, negative determination is made at step S411, and the process proceeds to step S417.

At this step S417, it is determined that an object is not present. The information indicating absence of an object is stored in the memory (not illustrated) of the object-information acquiring unit 203 together with detected time and values of the variables i and m. The process then proceeds to step S419.

At this step S419, it is determined whether a value of the variable m is 11 or larger. When the value of the variable m is smaller than 11, negative determination is made, and the process proceeds to step S421.

At this step S421, the value of the variable m is incremented by +1, and the process returns to step S407 described above.

Thereafter, until positive determination is made at step S419, processing at step S407 to S421 are repeated.

When the value of the variable m becomes 11 or larger, positive determination is made at step S419 described above, and the process proceeds to step S423.

At this step S423, it is determined whether the value of the variable i is 28 or larger. When the value of the variable i is smaller than 28, negative determination is made, and the process proceeds to step S425.

At this step S425, the value of the variable i is incremented by +1, and the process returns to step S403 described above.

Thereafter, until positive determination is made at step S423, processing at step S403 to S425 are repeated.

When the value of the variable i becomes 28 or larger, positive determination is made at step S423 described above, and the process proceeds to step S427.

At this step S427, for all of the partial regions, information on presence or absence of an object, and a distance to an object is read from the memory (not illustrated) of the object-information acquiring unit 203. When an object is present, object information about a position of the object, the size of the object, the shape of the object, and/or the like is acquired. Furthermore, the acquired object information is stored in the memory 50 together with detected time. Thus, the object-information acquiring processing is ended.

Returning back to FIG. 2, the main control device 40 determines whether the object moving when the object is present in front of the vehicle 1 based on the object information stored in the memory 50 or the like at each predetermined timing, and acquires movement information including a moving direction and a moving speed when the object is moving. The object information and the movement information are displayed on the display device 30.

Furthermore, when determining that there is a danger based on the object information and the movement information, the main control device 40 outputs alarm information to the sound/alarm generating device 60.

Figure 46:
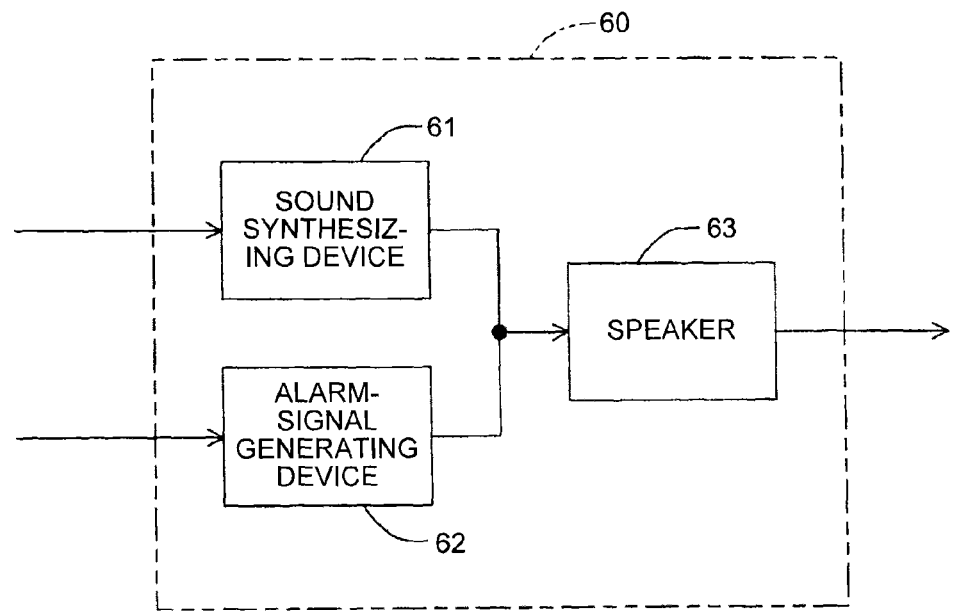
FIG. 46 is a block diagram for explaining a configuration of a sound/alarm generating device.

The sound/alarm generating device 60 includes a sound synthesizing device 61, an alarm-signal generating device 62, and a speaker 63 as indicated in FIG. 46 as an example.

The sound synthesizing device 61 has multiple pieces of sound data, and when receiving alarm information from the main control device 40, selects sound data corresponding thereto, to output to the speaker 63.

When receiving the alarm information from the main control device 40, the alarm-signal generating device 62 generates alarm information to output to the speaker 63.

As is obvious from the above explanation, the control unit and the processing unit of the object detection device of the present invention are composed by the object-information acquiring unit 203. Moreover, the monitoring control device of the sensing apparatus of the present invention is composed of the main control device 40, the memory 50, and the sound/alarm generating device 60.

As explained above, the laser radar 20 according to the present embodiment includes the light emission system 201, the light detection system 202, and the object-information acquiring unit 203.

The light emission system 201 includes the light source 21, the coupling lens 22, the first reflection mirror 23, and the first rotation mirror 24. The light detection system 202 includes the second rotation mirror 26, the second reflection mirror 27, and the image forming lens 28, the photo detector 29.

The light source 21 includes multiple light emitting unit groups that are arranged at regular intervals. Each of the light emitting unit groups includes multiple light emitting units that are two-dimensionally arranged. In this case, because the light intensity of the detection light emitted from the light emission system 201 can be increased, a detectable distance to an object can be increased.

Furthermore, the object-information acquiring unit 203 divides a scanning range into multiple partial regions, and groups the multiple light emitting units included in the light emitting unit group into multiple number of groups in the Y axis direction. A group to be turned on is determined for each partial region. That is, the object-information acquiring unit 203 determines light emitting units to be turned on among the multiple light emitting units according to a direction of emission of the detection light in the XY plane.

According to the laser radar 20, both improvement in detection resolution and increase of life of a light source can be achieved.

Moreover, the object-information acquiring unit 203 acquires a distance to an object based on turning on timing of the light source 21 and light reception timing of the photo detector 29 for each partial region. Furthermore, the object-information acquiring unit 203 acquires object information based on a distance to the object of each of the partial regions. At this point, the object information can be acquired accurately.

Furthermore, according to the monitoring device according to the present embodiment, because the laser radar 20 is equipped, the object information and the movement information can be accurately acquired.

Although a case in which the light emission system 201 is located in the +Z direction from the light detection system 202 has been explained in the above embodiment, it is not limited thereto.

Moreover, although a case in which the shape of the light emitting unit group is a square shape has been explained in the above embodiment, it is not limited thereto.

Furthermore, although a case in which the shape of the light emitting unit is a square shape has been explained in the above embodiment, it is not limited thereto.

Moreover, although a case in which the first rotation mirror 24 and the second rotation mirror 26 have four mirror surfaces has been explained in the above embodiment, it is not limited thereto.

Furthermore, in the above embodiment, a rotation mechanism that rotates the laser radar 20 about the Z axis may be included.

Moreover, in the above embodiment, the positions of the coupling lens 22 and the image forming lens 28 are not limited to the arrangement example 1 and the arrangement example 2.

Furthermore, in the above embodiment, the configuration of the light source 21 is not limited to the configuration example 1 and the configuration example 2.

Moreover, although a case in which the light source 21 has 28 light emitting unit groups has been explained in the above embodiment, it is not limited thereto. The number of the light emitting unit groups may be determined according to the size in the Z axis direction of a required detection region. The number of the light emitting unit group may be one.

Furthermore, although cases of the light emitting unit group in which 240 light emitting units are arranged along the Y axis direction and 240 light emitting units are arranged along the Z axis direction, and in which 220 light emitting units are arranged along the Y axis direction and 220 light emitting units are arranged along the Z axis direction have been explained in the above embodiment, it is not limited thereto. For example, each light emitting unit group may be one in which 150 light emitting units are arranged along the Y axis direction and 150 light emitting units are arranged along the Z axis direction. In this case, d1 described above is approximately 0.25 mm. Moreover, when the light emission power of a single light emitting unit is 1 mW, the light emission power of one light emitting unit group is 22.5 W.

Furthermore, although a case in which the number of light emitting units along the Y axis direction and the number of light emitting units along the Z axis direction are equal to each other in a light emitting unit group has been explained in the above embodiment, it is not limited thereto.

Moreover, a case in which light emitting units are two-dimensionally arranged in a light emitting unit group has been explained in the above embodiment, it is not limited thereto, and it is only required that light emitting units be arranged at least along the Y axis direction.

Furthermore, a case in which d2 is approximately 0.02 mm, d3 is approximately 0.7 and d4 is approximately 1 μm has been explained in the above embodiment, it is not limited thereto.

Moreover, a case in which a scanning range is divided into 11 partial regions has been explained in the above embodiment, it is not limited thereto. For example, a scanning range may be divided into 3 partial regions ($G_1$, $G_2$, and $G_3$). In this case, it may be arranged such that light emitting units in a light emitting unit group are divided into two groups of $H_1$ and $H_2$ in the Y axis direction, and only the group $H_1$ is turned on when the partial region $G_1$ is scanned, the groups $H_1$ and $H_2$ are turned on when the partial group $G_2$ is scanned, and only the group $H_2$ is turned on when the partial region $G_3$ is scanned.

Furthermore, in the above embodiment, the focal length f1 of the coupling lens 22 and the focal length f2 of the image forming lens 28 may be equal to each other. In this case, commonization of the coupling lens 22 and the image forming lens 28 is possible, and cost can be reduced.

Moreover, in the above embodiment, the main control device 40 may perform a part of the processing performed by the object-information acquiring unit 203, and the object-information acquiring unit 203 may perform a part of the processing performed by the main control device 40.

Figure 47:
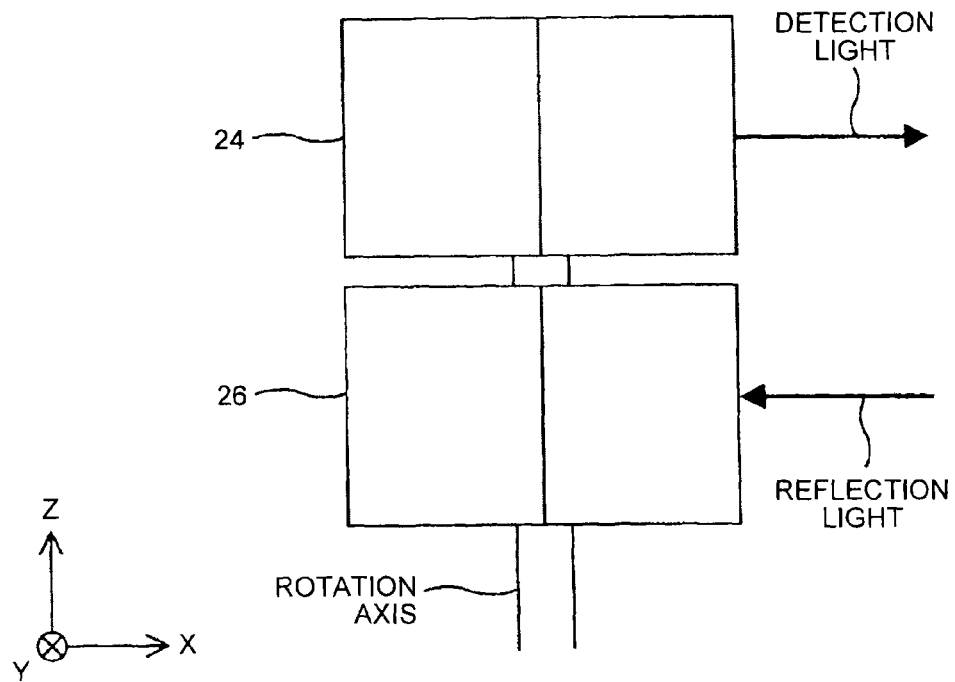
FIG. 47 is a diagram for explaining Example 1 of integration of the first rotation mirror and a second rotation mirror.
Figure 48:
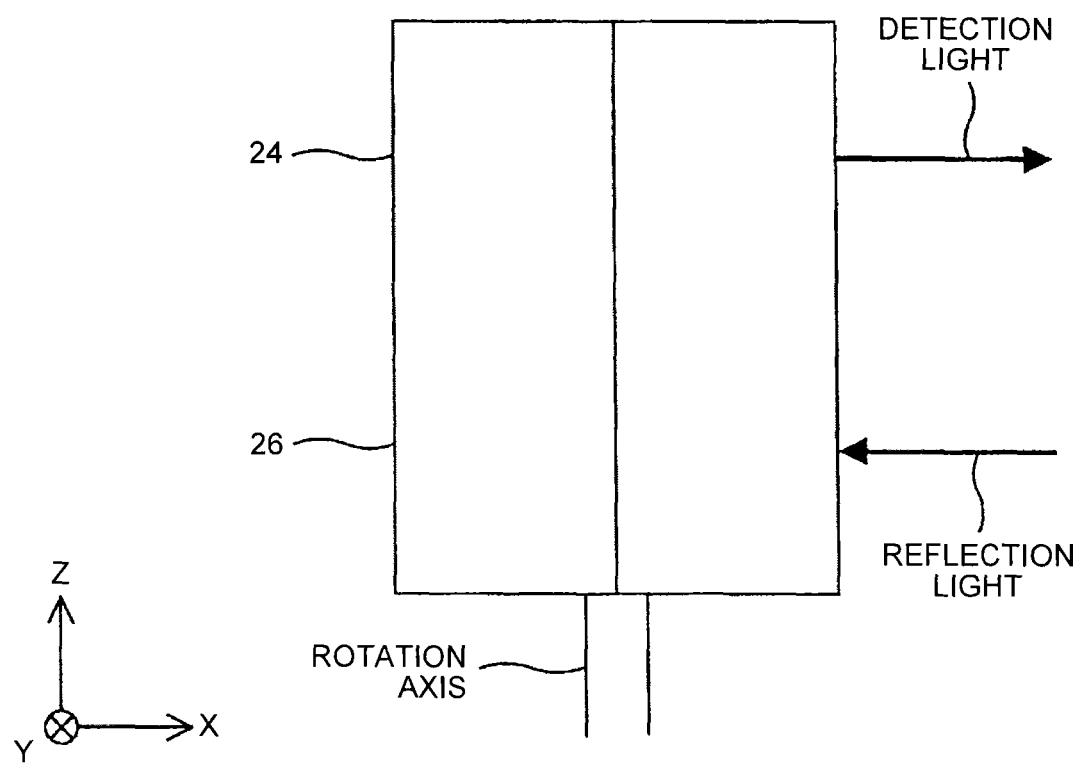
FIG. 48 is a diagram for explaining Example 2 of integration of the first rotation mirror and the second rotation mirror.

Furthermore, in the above embodiment, the first rotation mirror 24 and the second rotation mirror 26 may be integrated as indicated in FIG. 47 and FIG. 48.

Moreover, although a case in which the monitoring device 10 has a single unit of the laser radar 20 has been explained in the above embodiment, it is not limited thereto. More than one unit of the laser radar 20 may be equipped according to the size of a vehicle, a monitoring region, and the like.

Furthermore, although a case in which the laser radar 20 is used in the monitoring device 10 that monitors a direction in which a vehicle travels has been explained in the above embodiment, it is not limited thereto. For example, it may be equipped in a device that monitors a backward direction or a side of a vehicle.

Moreover, the laser radar 20 may be used in a sensing device other than that mounted on a vehicle. In this case, the main control device 40 outputs alarm information according to the purpose of sensing thereof.

Furthermore, the laser radar 20 may be used to detect only presence or absence of an object.

Moreover, the laser radar 20 may be used for purposes other than a sensing device (for example, a distance measuring device or a shape measuring device).

According to the object detection device of an embodiment, it is possible to achieve both improvement of detection resolution and increase of life of a light source.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An object detection device comprising:
   a light projector that includes a light source including plurality of light emitters that are arranged along at least one direction;
   a light scanner that scans light emitted from the light projector along the at least one direction;
   a light receiver that receives light emitted from the light scanner and reflected on an object; and
   a processor that determines a light emitter to be turned on among the light emitters, according to a direction of travel of light scanned by the light scanner,
   wherein when light emitted from the light scanner travels toward an end of a scanning range of the light scanner, the processor controls a number of light emitters to be turned on among the light emitters to be less than that when light emitted from the light scanner travels toward a central part of the scanning range.

2. The object detection device according to claim 1, wherein:
   the light scanner scans from one end of the scanning range toward the other end thereof, and
   the processor increases the number of light emitters to be turned on among the light emitters when light emitted from the light scanner scans from one end of the scanning range to the central part thereof, and decreases the number of light emitters to be turned on among the light emitters when light emitted from the light scanner scans from the central part of the scanning range to the other end thereof.

3. The object detection device according to claim 2, wherein:
   the processor divides the scanning range into a plurality of regions, and determines the number of light emitters to be turned on among the light emitters, for each of the regions.

4. The object detection device according to claim 3, wherein:
   the processor divides the scanning range into 2M−1 regions (M is a positive integer equal to or larger than 3), and divides the light emitters into M groups in the one direction, sequentially turns on a first group to an M-th group among the M groups as light emitted from the light scanner shifts from a first region to an M-th region among the 2M−1 regions, and sequentially turns off the first group to an M−1-th group among the M groups as light emitted from the light scanner shifts from an M+1-th region to a 2M−1-th region among the 2M−1 regions.

5. The object detection device according to claim 3, wherein:
   the processor divides the scanning range into three regions of $G_1$, $G_2$, and $G_3$, divides the light emitters into two groups of $H_1$ and $H_2$, turns on only the group $H_1$ when light emitted from the light scanner scans the region $G_1$, turns on the groups $H_1$ and $H_2$ when the region $G_2$ is scanned, and turns on only the group $H_2$ when the region $G_3$ is scanned.

6. The object detection device according to claim 3, wherein:
the processor divides the scanning range into 2M−1 regions (M is a positive integer equal to or larger than 2), divides the light emitters into 2M−1 groups in the one direction, turns on all of the 2M−1 groups when light emitted from the light scanner scans an M-th region among the 2M−1 regions, and does not turn on an M-th group among the 2M−1 groups when light emitted from the light scanner scans regions other than the M-th region among the 2M−1 regions.

7. The object detection device according to claim 4, wherein:
the light scanner has a reflection surface that reflects light emitted from the light projector,
when light emitted from the first group among the light emitters and reflected on the reflection surface scans the first region in the scanning range, a reflection position of the light emitted from the first group on the reflection surface is positioned closer to a central part on the reflection surface than a reflection position of light emitted from the other groups.

8. The object detection device according to claim 5, wherein:
the light scanner has a reflection surface that reflects light emitted from the light projector,
when light emitted from the first group among the light emitters and reflected on the reflection surface scans the first region in the scanning range, a reflection position of the light emitted from the first group on the reflection surface is positioned closer to a central part on the reflection surface than a reflection position of light emitted from the other groups.

9. The object detection device according to claim 6, wherein:
the light scanner has a reflection surface that reflects light emitted from the light projector,
when light emitted from the first group among the light emitters and reflected on the reflection surface scans the first region in the scanning range, a reflection position of the light emitted from the first group on the reflection surface is positioned closer to a central part on the reflection surface than a reflection position of light emitted from the other groups.

10. The object detection device according to claim 1, further comprising:
a first lens that is arranged on an optical path of light emitted from the light source; and
a second lens that is arranged in front of the light receiver, and that collects light reflected on the object,
wherein a distance between the light source and the first lens is equal to a focal length of the first lens, and a distance between the light receiver and the second lens is longer than a focal length of the second lens.

11. The object detection device according to claim 1, further comprising:
a first lens that is arranged on an optical path of light emitted from the light source; and
a second lens that is arranged in front of the light receiver, and that collects light reflected on the object, wherein
a distance between the light source and the first lens is longer than a focal length of the first lens, and a distance between the light receiver and the second lens is equal to a focal length of the second lens.

12. The object detection device according to claim 10, wherein:
the focal length of the first lens and the focal length of the second lens are equal to each other.

13. The object detection device according to claim 1, further comprising:
processing circuitry that acquires information about a distance to the object based on turning on timing of the light source and light reception timing of the light receiver when the light receiver receives light reflected on the object.

14. The object detection device according to claim 13, wherein
the processing circuitry acquires a shape of the object based on the information of a distance to the object in each emission direction of light emitted from the light scanner.

15. The object detection device according to claim 1, wherein
the light source includes a plurality of light emitter groups that each include a plurality of light emitters, and the light emitter groups are arranged along a direction perpendicular to the one direction.

16. A sensing apparatus comprising:
the object detection device according to claim 1; and
monitoring control circuitry that acquires movement information including at least one of presence or absence of movement of an object, a moving direction, and a moving speed, based on an output of the object detection device.

17. The sensing apparatus according to claim 16, further comprising:
a display device that displays at least one of position information and the movement information of the object.

18. The sensing apparatus according to claim 16, wherein:
the sensing apparatus is on a vehicle, and
the monitoring control circuitry outputs alarm information when determining that there is a danger based on at least one of position information and the movement information of the object.

19. An object detection device comprising:
a light projector that includes a light source including a plurality of light emitters that are arranged along at least one direction;
a light scanner that scans light emitted from the light projector along the at least one direction;
a light receiver that receives light emitted from the light scanner and reflected on an object;
a processor that determines a light emitter to be turned on among the light emitters, according to a direction of travel of light scanned by the light scanner;
a first lens that is arranged on an optical path of light emitted from the light source; and
a second lens that is arranged in front of the light receiver, and that collects light reflected on the object,
wherein a distance between the light source and the first lens is equal to a focal length of the first lens, and a distance between the light receiver and the second lens is longer than a focal length of the second lens.

20. An object detection device comprising:
a light projector that includes a light source including a plurality of light emitters that are arranged along at least one direction;
a light scanner that scans light emitted from the light projector along the at least one direction;

a light receiver that receives light emitted from the light scanner and reflected on an object;

a processor that determines a light emitter to be turned on among the light emitters, according to a direction of travel of light scanned by the light scanner;

a first lens that is arranged on an optical path of light emitted from the light source; and a second lens that is arranged in front of the light receiver, and that collects light reflected on the object, wherein a distance between the light source and the first lens is longer than a focal length of the first lens, and a distance between the light receiver and the second lens is equal to a focal length of the second lens.

* * * * *